United States Patent [19]

Hamada et al.

[11] Patent Number: 5,596,720
[45] Date of Patent: Jan. 21, 1997

[54] REDUNDANT MESSAGE PROCESSING SYSTEM FEATURING RECEPTION SERVER CONTROLLING COMMUNICATION BETWEEN CLIENT AND SERVER PROCESS, AND STAND-BY SERVER RETRANSMITTING MESSAGE WITH INFORMATION INDICATING THE MESSAGE BEING A RETRANSMITTED MESSAGE

[75] Inventors: Syuji Hamada; Koji Miyazaki; Hidefumi Maruyama, all of Numazu, Japan

[73] Assignee: Fujitsu Limited, Kawasaki, Japan

[21] Appl. No.: 237,408

[22] Filed: May 3, 1994

Related U.S. Application Data

[63] Continuation of Ser. No. 773,937, filed as PCT/JP91/00293, Mar. 5, 1991, WO91/14230, Sep. 19, 1991, abandoned.

[30] Foreign Application Priority Data

| Mar. 5, 1990 | [JP] | Japan | 2-53391 |
| May 30, 1990 | [JP] | Japan | 2-140905 |
| Jun. 18, 1990 | [JP] | Japan | 2-159362 |

[51] Int. Cl.⁶ ............................ G06F 11/00; G06F 11/16
[52] U.S. Cl. ......................... 395/200.03; 395/182.09
[58] Field of Search ........................ 371/12, 13, 8.1, 371/9.1; 395/600, 650, 575, 182.08, 182.09, 182.11, 182.16, 200.03

[56] References Cited

U.S. PATENT DOCUMENTS

| 4,264,954 | 4/1981 | Briggs et al. | 395/200 |
| 4,503,535 | 3/1985 | Budde et al. | 371/11.3 |
| 4,570,261 | 2/1986 | Maher | 371/16.1 |
| 4,665,520 | 5/1987 | Strom et al. | 371/7 |
| 4,751,702 | 6/1988 | Beier et al. | 395/182.11 |
| 4,785,396 | 11/1988 | Murphy et al. | 395/286 |
| 4,815,028 | 3/1989 | Saitoh | 395/575 |
| 4,887,204 | 12/1989 | Johnson et al. | 395/600 |
| 4,977,500 | 12/1990 | Ogata et al. | 395/575 |
| 5,101,348 | 3/1992 | Arrowood et al. | 395/200 |
| 5,247,670 | 9/1993 | Matsunaga | 395/650 |

FOREIGN PATENT DOCUMENTS

| 61-243559 | 10/1986 | Japan . |
| 62-280955 | 12/1987 | Japan . |
| 63-211451 | 9/1988 | Japan . |
| 1-166159 | 6/1989 | Japan . |

OTHER PUBLICATIONS

Uppaluru et al., "Reliable servers in the JASMIN Distributed system", *7th International Conference on Distributed Computing Systems*, pp. 105–112, Sep. 1987.
Johnson et al., "Sender-based Message Logging", *17th Int. Symp. on Fault-Tolerant Computing*, pp. 14–19, Jul., 1987.
Strom et al., "Optimistic Recovery in Distributed Systems", *ACM Transactions on Computer Systems*, pp. 204–226, Aug. No. 3, 1985.
Murphy et al., "Service specification and protocol construction for the transport layer", *Computer Communication Review*, pp. 88–97, Aug., No. 4, 1988.
Bochmann et al., "Gateways for the OSI Transport Service", *6th Annual Conference Global Networks, Concept to Realization*, pp. 1045–1052, Mar. 1987.

*Primary Examiner*—Thomas C. Lee
*Assistant Examiner*—D. Dinh
*Attorney, Agent, or Firm*—Staas & Halsey

[57] ABSTRACT

The present invention discloses a message communication system and a distribution system. The feature of the present invention lies in various functions in the reception server, which is provided between the client server and the processing server. For example, the reception server performs reference processing, update processing, redundancy processing, etc. In the claimed invention, a reception server 20 is arranged between a client process 10, and a processing server 30. A demand discrimination stage 25 is provided for discriminating a demand only for a reference process and not requiring an update of medium and exclusive resources, and a demand for a reference process and reference and update process requiring a change of condition of the resource. The demand discrimination stage 25 classifies respective message communications systems into three aspects.

13 Claims, 24 Drawing Sheets

REDUNDANT MESSAGE PROCESSING SYSTEM FEATURING RECEPTION SERVER CONTROLLING COMMUNICATION BETWEEN CLIENT AND SERVER PROCESS, AND STAND-BY SERVER RETRANSMITTING MESSAGE WITH INFORMATION INDICATING THE MESSAGE BEING A RETRANSMITTED MESSAGE

This application is a continuation, of application Ser. No. 07/773,937, filed as PCT/JP91/00293, Mar. 5, 1991, WO91/14230, Sep. 19, 1991, now abandoned.

BACKGROUND OF THE INVENTION

1. Field of the Invention

The present invention relates to a message communication system, particularly to a message communication system in a distributed processing system establishing a network through a plurality of nodes for message communication between a client in one node and a server in another node, between servers in different nodes and between servers in the same nodes.

2. Background of the Related Art

In recent years, distribution processing systems establishing networks with a plurality of nodes are expanding in various fields. One example is the use of a LAN (local area network). Each node is composed of a processor, memory and so forth and connected through an optical fiber and so forth to form a network. The distributed processing system is intended to provide a higher process speed by distributed processing of messages between nodes or through the processors in respective nodes.

In the distributed processing system, there is a possibility of occurrence of a server failure due to failure of hardware or software during message communications between a client in one node and a server in another node or between servers in the same node.

In general, as a back-up for the server failure caused by failure of the hardware, another stand-by system is provided in addition to a current system. Upon occurrence of the server failure in the current system, the stand-by system instantly takes over the operation, thereby preventing system down time.

In addition, the only solution for the server failure caused by failure of software in the prior art is to find bugs in the program for manual correction. During this period, the stand-by system is unavoidably used.

SUMMARY OF THE INVENTION

It is one object Of the invention to realize a back-up with small overhead for server failure originating from a software problem, either in message communications between a client in one node and a server in another node, between servers in different nodes or between servers in the same nodes.

Another object of the present invention is to effectively discriminate whether the received message is a re-transmitted message or a redundantly transmitted message in a processing server, when a reception server which receives a service demand from a client, in message communication between the client in one node and the server in another node, calls for a service to a client by the processing server which serves as service provider.

A further object of the present invention is to prevent messages from dropping out and detect redundant transmission by storing a message identifier in a non-volatile memory in the message communication between the client in one node and the server in another node, and by enabling a stand-by system to perform re-transmission of a message with an identifier indicative of the fact that the message is re-transmitted, in place of the current system with reference to the message identifier stored in the non-volatile memory, upon occurrence of the breakdown of the current transmission side.

In order to accomplish the above-mentioned objects, the following inventions are proposed.

According to the basic aspect of the invention, a message communication processing in a distributed processing system, which comprises a client server, a processing server and a reception server including a demand discrimination means. The demand discrimination means distinguishes a demand only for processing of references and not associated with updating the medium or exclusiveness of resources, and a demand for a reference process and reference and updating process associated with a change of state of the resource.

According to the first aspect of the invention, the processing server comprises a discrimination stage for discriminating whether the process for the message transmitted from the client has already been completed, a demand processing stage for performing a process for the message from the client when the discriminating stage makes the judgement that the process is not completed, a writing stage for writing the results of the process performed in the demand processing stage to a non-volatile memory, and an issuing stage for issuing two kinds of notices, that is, the issuing stage issues a notice of completion of process to the client when the discrimination stage determines the completion of the process, and the issuing stage issues a notice of normal completion of process to the client when the discrimination stage determines the non-completion of the process. The client determines the normal completion when it receives a notice of normal completion of process from the issuing stage in a re-transmission process for the message.

According to another aspect of the invention, the reception server is provided between the client server and a plurality of processing servers, the reception server identifies a processing server which becomes a service provider for the service demand, and demands provision of the service for the identified processing server, the reception server adds an identifier and a re-transmission count added to the message from the client to the message to be transmitted to the process server, and the process server holds the identifier and two kinds of re-transmission counts as change over information for a stand-by system, the processing server performing a comparison for the two kinds of re-transmission counts with the held values corresponding to the re-transmission count to discriminate whether the message is a re-transmitted message or a redundantly transmitted message. The process in the comparison is performed in such a manner that, when the re-transmission count is greater than the corresponding held value, it is determined to be a re-transmitted message, when smaller, it is considered a redundantly transmitted message, and when equal, further comparison is made for the re-transmission count added to the message by the reception server with the corresponding held value determining that the re-transmission count is a re-transmitted message when greater and a redundantly transmitted message when smaller or equal than the held value.

According to a further aspect of the invention, for the system including a stand-by system in addition to a current system, a non-volatile memory for storing the message and the message identifier, is provided in common with the current system and the stand-by system, and for the current system and the stand-by system, an identifier discrimination stage for discriminating whether the message identifier is indicative of a retransmission of the message proceeds. The message identifier comprises a multi-demand ID, a content of a demand counter and a content of a re-transmission counter; the multi-demand ID and message identifier corresponding to the contend of the new and re-transmission, are added when the message is transmitted.

DESCRIPTION OF THE PREFERRED EMBODIMENTS

Figure 1:
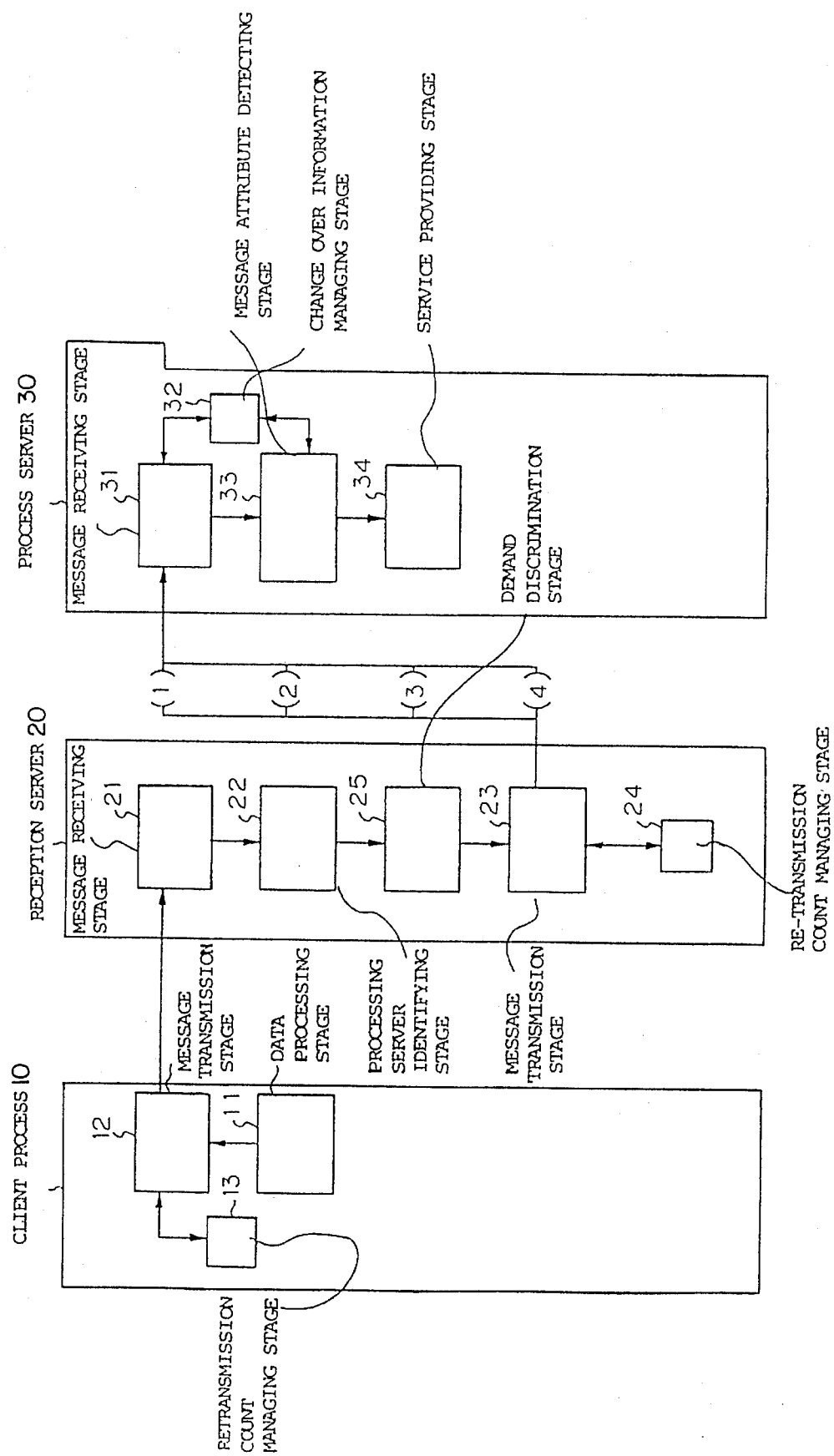
FIG. 1 is a block diagram showing basic construction of the present invention.

FIG. 1 is a constructional illustration showing the basic structure of the present invention. As shown, the system is constructed by arranging a reception server 20 between a client process 10, and a processing server 30. A data processing stage 11, a message transmitting stage 12 and a re-transmission count managing stage 13 are provided in the client process 10. The reception server 20 includes a message receiving stage 21, a processing server identifying stage 22, a message transmission stage 23, a re-transmission count managing stage 24 and a demand discrimination stage 25. On the other hand, the processing server 30 includes a message receiving stage 31, a change over information managing stage 32, a message attribute detecting stage 33 and a service providing stage 34.

In the basic construction of the invention, the demand discrimination stage 25 is provided in the demand reception server 20. The message discrimination stage 25 classifies a respective message communication system in first, second and third aspects which will be discussed later. Namely, according to the type of demand, each system is selected. Order for selection is the following (1), (2), (3), (4). With this, the necessary overhead can be minimized. As is clear from the following discussion, (2) corresponds to the first aspect, (3) corresponds to the second aspect, and (4) corresponds to the third aspect.

(1) This type is for a reference type demand which does not require updating of a medium or exclusive state of a source. In this case, only a re-transmission system is used and no overhead exists. This case will not be discussed in the present invention.

(2) This type is an updating type demand but can be processed without requiring knowledge of re-transmission or redundant transmission. In this type, the demander can determine the result of the process, such as completion of process. Here, identifying a re-transmission or redundant transmission means or requires detection of the demand for re-transmission or redundant transmission, and abandoning the demand regarding or when the re-transmission is normal. This type occurs in communication between servers. In the following discussion for the first aspect in the present invention, the process content is stored in the non-volatile memory only at the processing server.

(3) This type is for the process of the processing server for guarantee of, the function viewed from the client. In this case, the reception server only identifies the processing server. In the later discussion of the second aspect of the present invention, it is similar to the above-mentioned (2) at the point that the content of the process is stored in the non-volatile memory only at the processing server. However, the addition of a unique re-transmission count is done in the reception server. The process for guaranteeing the function, means or is the process for completely achieving generation.

(4) This type is for the process of the reception server for guaranteeing the function as viewed from the side of the client. In this case, the reception server demands a process for the processing server in if the processing server operates as parts. In later mentioned the third type process, the content of the process is stored in the non-volatile memory at both the reception server and the processing server.

The process performed by the demand discrimination stage 25 will be discussed herebelow. In the drawings, (1) to (4) corresponds to (1) to (4) system selection set forth above.

When demand is for the process of (1), no process is performed, since it is a demand only for reference.

When demand is for the process (2), no process is performed since a process can be made without being conscious or aware of re-transmission or redundant transmission and the demander may determine the result of the process, such as process completion or so forth, as set forth above even though the demanded process is for updating.

When demand is for process (3), a re-transmission counter is established between the client and reception server and between the reception server and the processing server. Also, a message identifier for identifying the message from the client is set.

When demand is for the process (4), as will be discussed later with respect to the third aspect, multiple demand ID is assigned for the identifier to definitely set the message identifier. The message identifier consists of or includes the multiple demand ID, the demand counter and re-transmission counter. This is used between the reception server and the processing server. At the reception server, for providing a back-up for failure in the reception server, the content of the transmitted message is transferred to the non-volatile memory.

Hereafter, discussion will be given for the first aspect according to the invention.

Figure 7A:
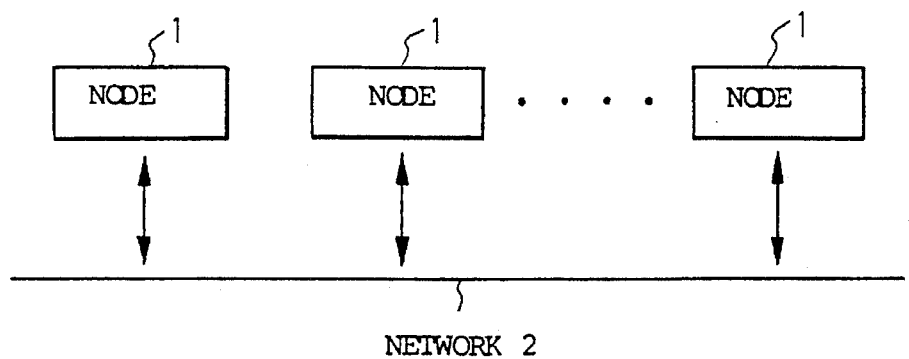
FIGS. 7A and 7B are block diagrams showing a distributed processing system.
Figure 7B:
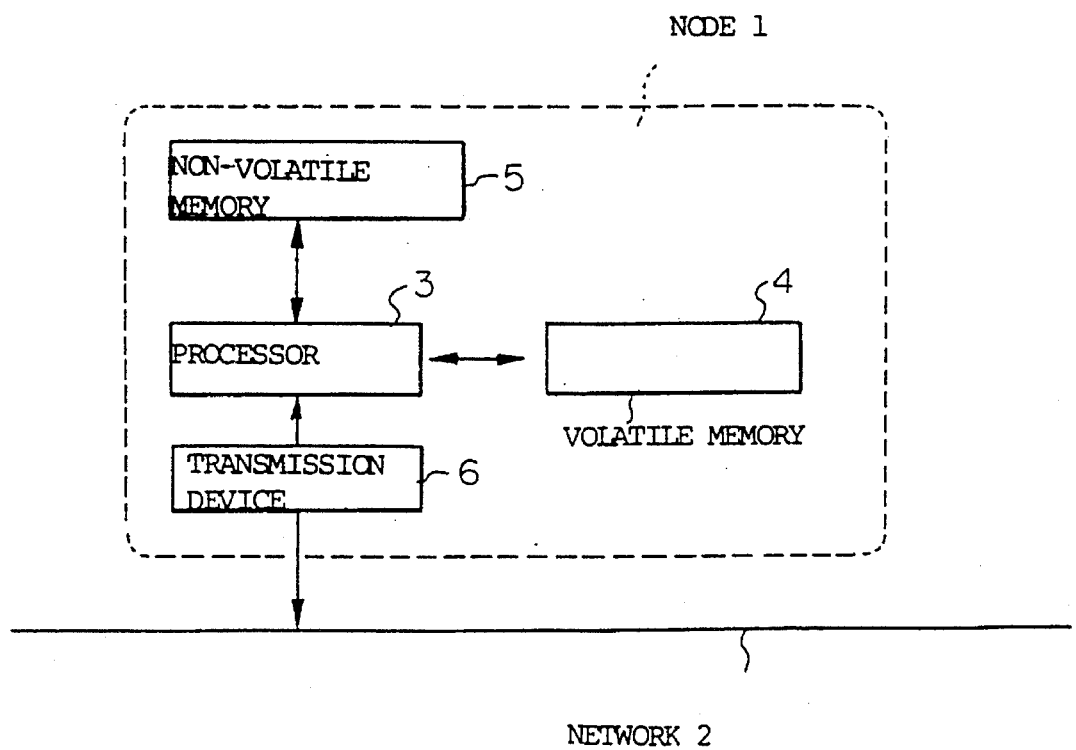

As shown in FIG. 7A and 7B, discussion will be given for the distributed process system, in which nodes 1 each having a processor 3, a volatile memory 4, a non-volatile memory 5, and communication or transmission device 6, are connected through a network 2. In such a system, exchange of information between the nodes 1 is done by way of message communication.

Figure 8A:
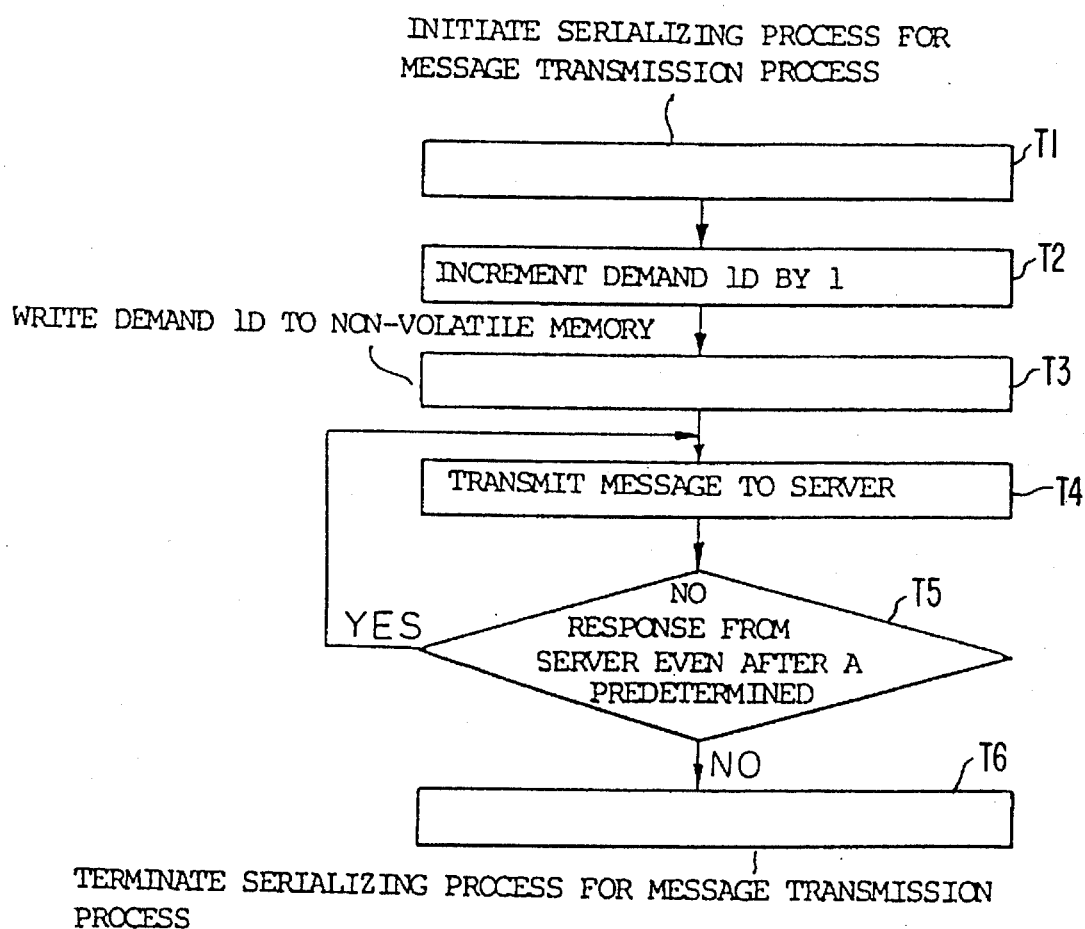
FIGS. 8A and 8B are flowcharts showing a process in the prior art.
Figure 8B:
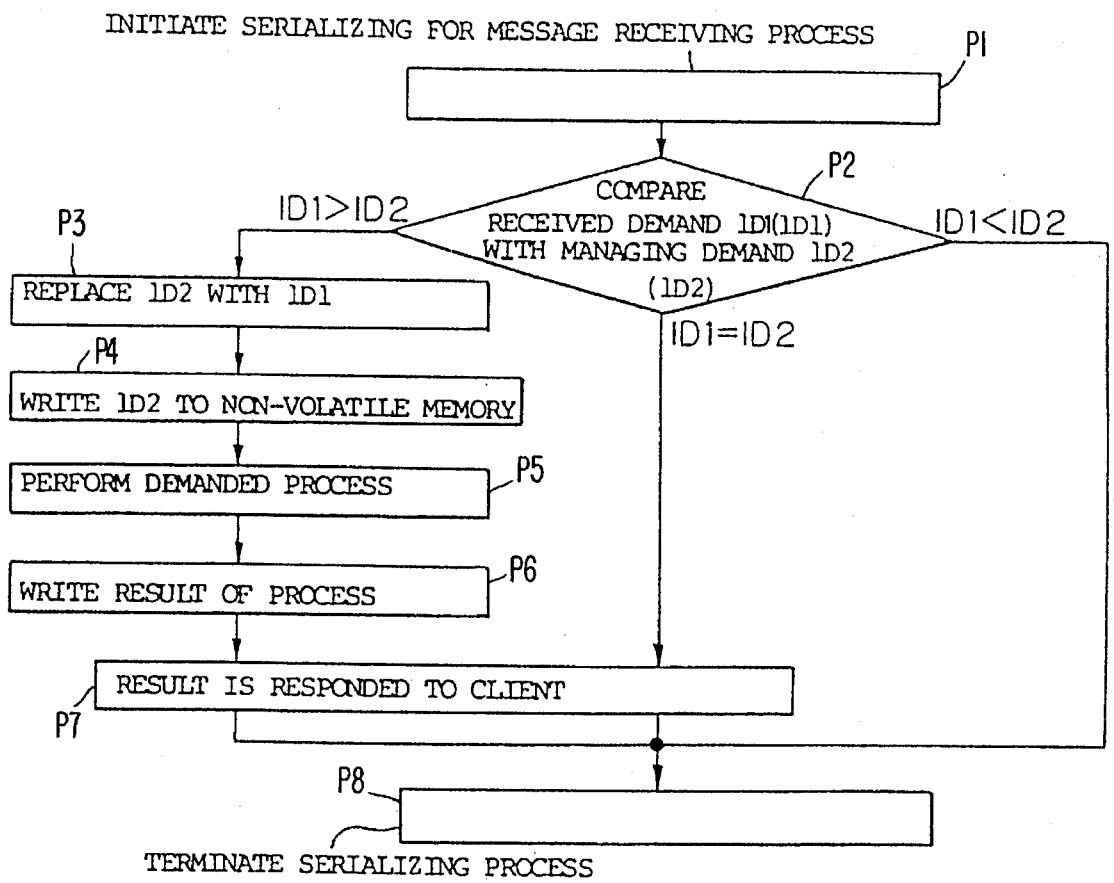

FIGS. 8A and 8B are flowcharts showing the conventional process. FIG. 8A is a message transmission process executed by the client. FIG. 8B is a message reception process executed by the server.

In message communication, there are delay problems and random order of the message problems in general. Namely, a message can be delayed for a random period and can be lost. In addition, the order of transmission at the transmission side and the order of reception at the receiving side are generally not consistent with each other.

As a solution for such problems, the following method has been applied in the prior art. Hereafter, discussion for an exemplary process in the case wherein the client in one node 1 demands a server process in a different node 1 by a message.

(a) Solution for Delay of Message

Client will transmit a message again when a response message from the server cannot be received even if a certain period elapses. Namely, re-transmission of message is performed. See steps T4–T6 in FIG. 8A.

(b) Solution for Random Order of Message

The client gives demand ID's for a message to every demand for the server in incremental order. Giving demand ID's in incremental order means that when re-transmission is performed the same demand ID is used, and after receiving a response from the server, a demand ID incremented by "1" is used for the next transmission of the demand message. See steps T2–T3 in FIG. 8A. On the other hand, the server manages the demand ID with respect to each of the demands and selects the message according to the following protocol.

(1) If "managing demand ID"="new demand ID(ID 2) transmitted from the client" (ID 1), the message from the client is a re-transmitted one. Therefore, for the client, only the result of the process is noticed or transmitted to the client.

(2) If "managing demand ID">"new demand ID transmitted from the client", the message from the client is a delayed re-transmitted message. Therefore, it is ignored.

(3) If "managing demand ID"<"new demand ID transmitted from the client", the message from the client is a new demand. Then, the demand is processed and the response message is transmitted to the client. Also, the "managing demand ID is reset by the" new demand ID transmitted from the client. See steps P1-P8 in FIG. 8B.

In the message communication performing the process set forth above, when the a failure occurs at the node 1 where the client exists, in order to realize a fault tolerant (FT) approach, the client is capable of writing the demand ID in the non-volatile memory to guarantee incrementing of the demand ID, and takes a method for updating the content thereof on every occasion of issuing a demand for the server. Once a failure occurs, the information is recovered to a volatile memory 4 and restored to a condition having no inconsistency to restart issuance of the demand. Here, the fault tolerant approach is an approach for withstanding the fault by positively employing the redundant design.

On the other hand, when the a failure occurs at the node 1 where the server exists, in order to realize a fault tolerant (FT) approach, the construction is employed to write the demand ID transmitted from the client in the non-volatile memory and is taken to update the contents every time the new demand ID arrives. At this time, in order to conceal the influence of server failure from the sight of the client, the result of the process in response to the message and the information necessary for restoring the environment that the server manages, are also written in the non-volatile memory. Once failure occurs, the information is recalled to the volatile memory 4 and restored to a state having no inconsistency, and reception of the demand is resumed.

Figure 9A:
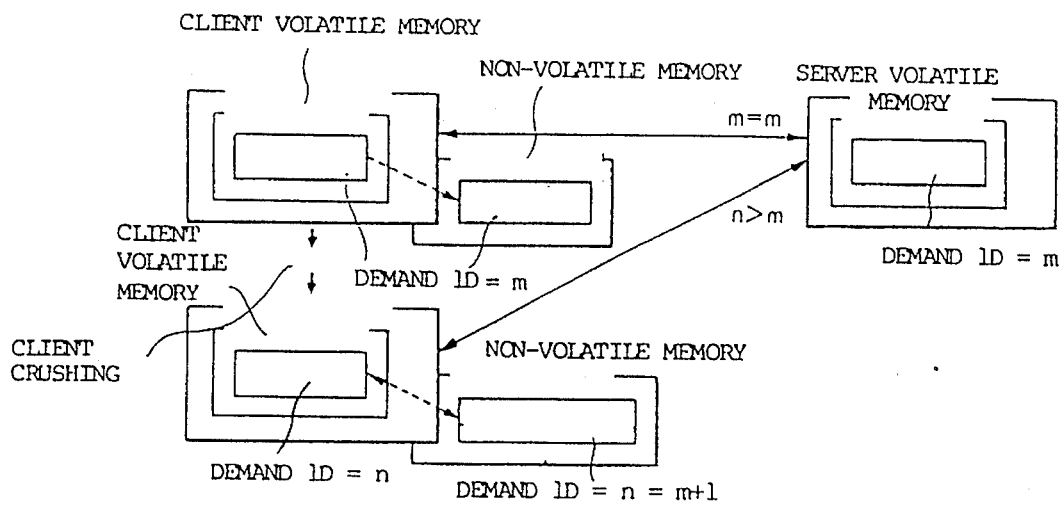
FIGS. 9A and 9B are explanatory illustrations showing the process in the prior art.
Figure 9B:
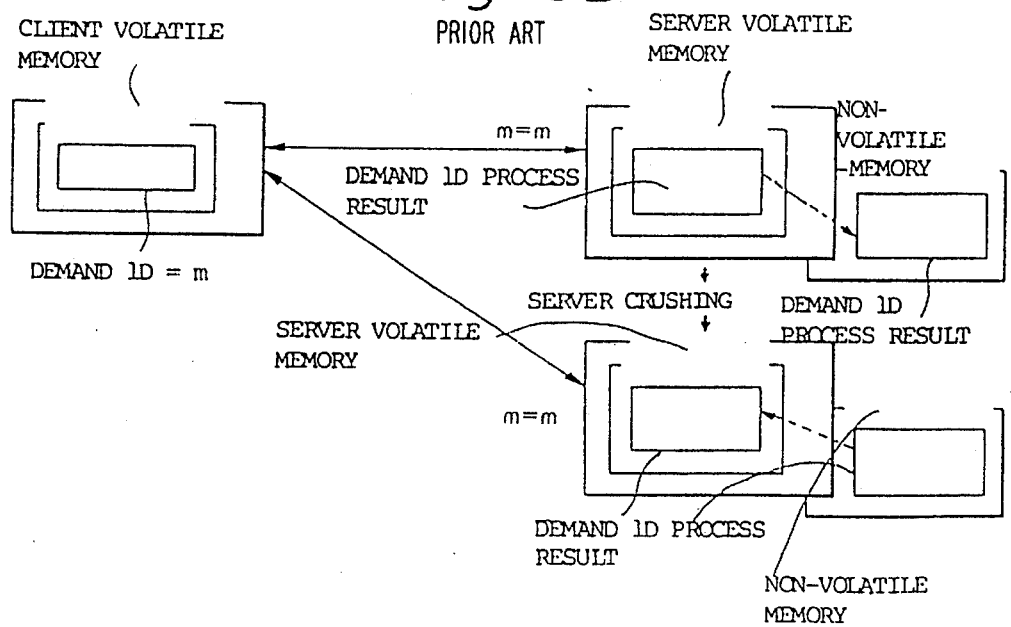

FIG. 9A and 9B shows an explanatory illustration of the process in the prior art. Here, FIG. 9A illustrates a recovery process taken place at a failure of the client. FIG. 9B shows the recovery process when a failure occurs at the server.

However, in such a prior art, as can be clear from the flowchart of FIG. 8B, the server has to write the demand ID given to the message in addition to the result of process (including the information required for restoring the environment for management of the server). As is well known, accessing the non-volatile memory 5 requires a much longer period than that for accessing the volatile memory 4. By this, a problem is encountered in the excessive overhead for dealing with or recovering from failure the server.

The first type of process of the present invention has an object in view of the problem set forth above, to provide a novel message communication system which can deal with the server failure with small overhead.

Figure 2:
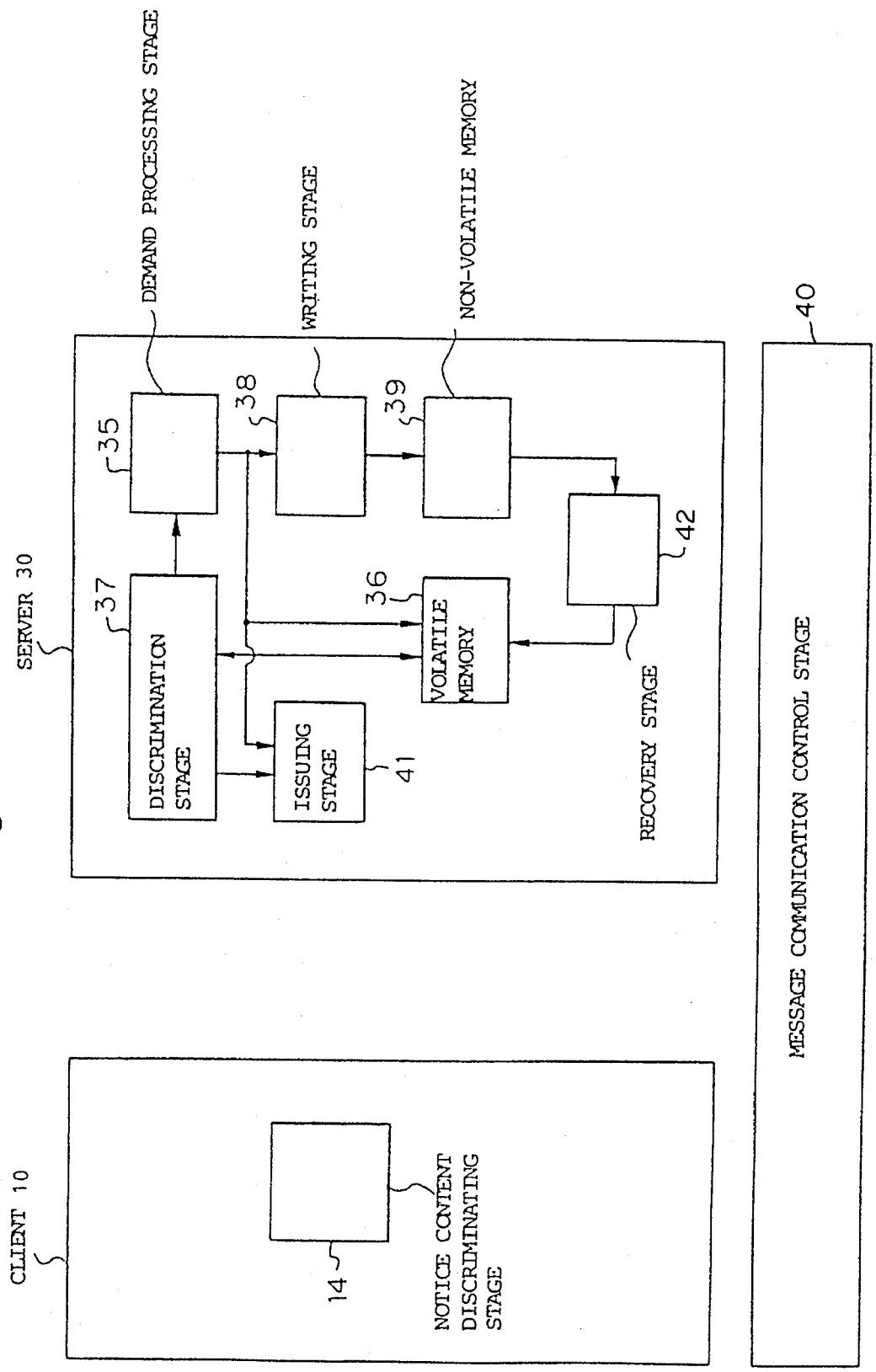
FIG. 2 is a basic block diagram showing the first aspect or embodiments of the invention.

FIG. 2 is a basic block diagram of the first aspect of the present invention.

In the drawings, the reference numeral 10 denotes a client belonging to a different node of the distributed processing system and demands a service from a server 30. The reference numeral 30 denotes a server in a certain node in the distributed processing system and provides a specific service. The reference numeral 40 denotes a message communication control section or stage for controlling message communication between the server 30 and the client 10.

The server 30 comprises a demand processing stage 35, a volatile memory 36, a discrimination stage 37, a writing stage 38, a non-volatile memory 39, a recovery stage 42 and an issuing stage 41. The demand processing stage 35 processes the service demand from the client 10. The volatile memory 36 stores the result of process in the demand processing stage 35. The discrimination stage 37 discriminates whether the service demand from the client 10 is completed or not on the basis of the stored data in the volatile memory 36. The write stage 38 writes in the results of the process to the non-volatile memory 39. The non-volatile memory 39 maintains the written results of process even when failure occurs. The recovery stage 42 recalls the results of the process maintained in the non-volatile memory 39 to the volatile memory 36 upon resumption of the failure. The issuing stage 41 issues a notice for the process being completed when it is determined that the process is completed, and issues a notice for normal completion of the demand processing stage 35 for the client 10 when it is determined that the process is not yet completed.

The client terminates re-transmission of the message when it is determined that the process is successfully terminated according to the discrimination process performed by the discrimination stage 14 for discriminating the content of the notice.

As set forth, according to the first aspect of the present invention, the server 30 performs the process so as not to write the demand ID to the non-volatile memory and thus can reduce the frequency of accessing the non-volatile memory 39. Therefore, it can realize a smaller overhead for dealing with the server failure.

An embodiment of the first type of process according to the present invention will be discussed in detail, hereafter.

Figure 3:
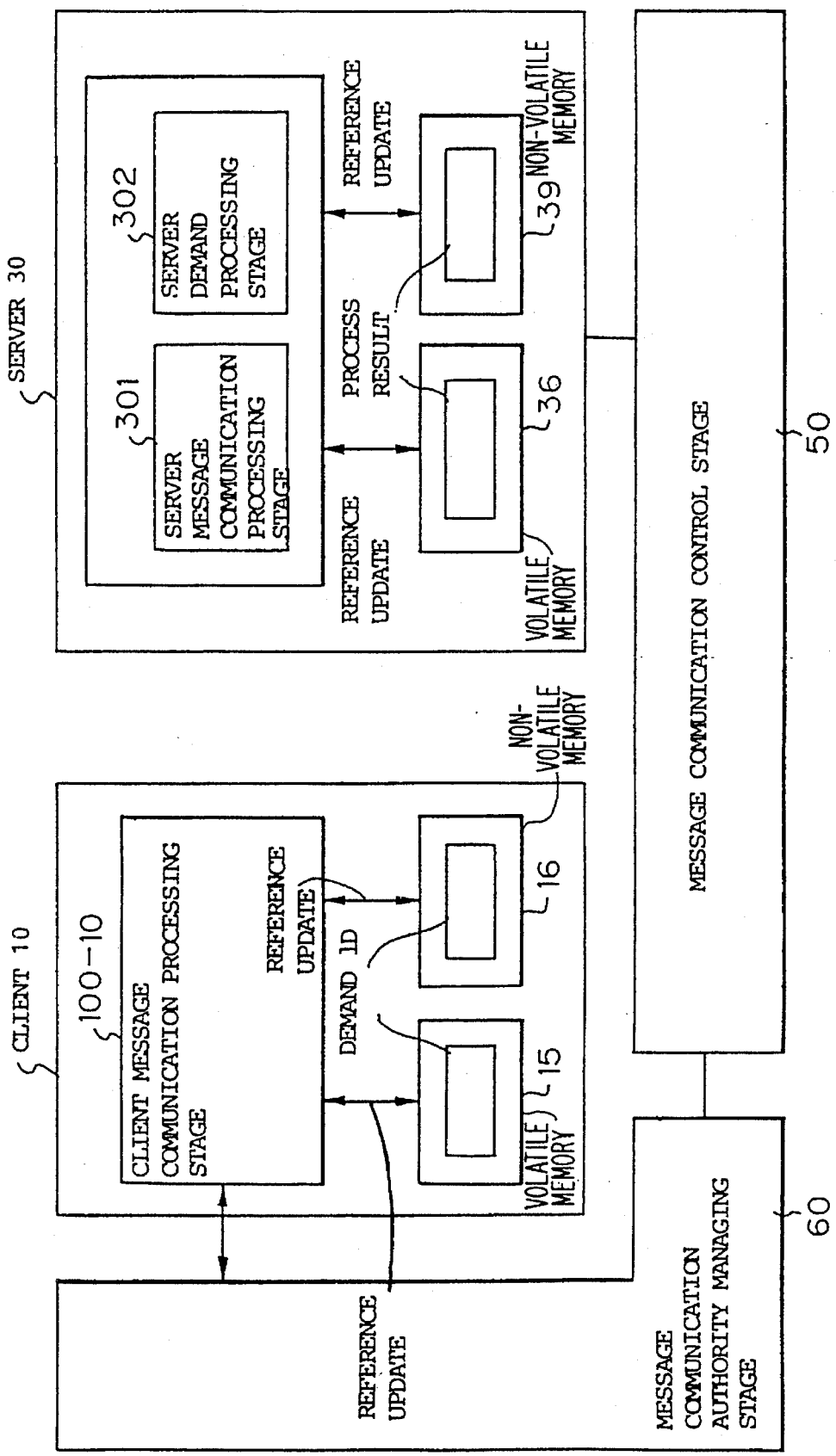
FIG. 3 is an exemplary block diagram of the structure for implementing the first aspect.

FIG. 3 shows one embodiment of the detailed construction for realizing the first aspect of the invention.

In the drawing, the same element as that discussed with respect to FIG. 2 will be represented by the same reference numerals. The reference numeral 301 denotes a server message communication processing stage incorporated in the server 30 and performs a control for message communication with the client 10. The reference numeral 302 denotes a server demand processing stage in the server 30, and performs a service process demanded through the message communication from the client. The reference numeral 15 denotes a volatile memory provided in the client 10, and manages the demand ID to be added to the message and transmitted to the server. The reference numeral 16 denotes a non-volatile memory in the client for storing the demand ID identical to that stored in the volatile memory 15 in a non-volatile fashion so as to deal with the failure at the client. The reference numeral 100-10 denotes a client message communication processing stage and performs a control of the message communication with the server 30. The reference numeral 60 denotes a message communication authority managing stage which provides authority for the client to perform message transmission for the server 30.

The client message communication processing stage 100-01 increments the demand ID in the volatile memory 15 and the incremented demand ID is stored in the volatile memory 15, and then transmits the message to the server 30 by adding or appending the incremented demand ID, when a new message is to be transmitted to the server 30. When a response from the server 30 cannot be received even after expiration of the predetermined period, the re-transmission of the transmitting message with the same demand ID is performed. The client message communication processing stage 100-10 thus proceesd to perform the serializing process in the message transmission through the process set forth above. Then, if a client failure occurs, the demand ID maintained in the non-volatile memory 16 is recalled in the volatile memory upon resumption of processing after the failure, to process for continuation of the serializing process in the message communication.

Figure 4:
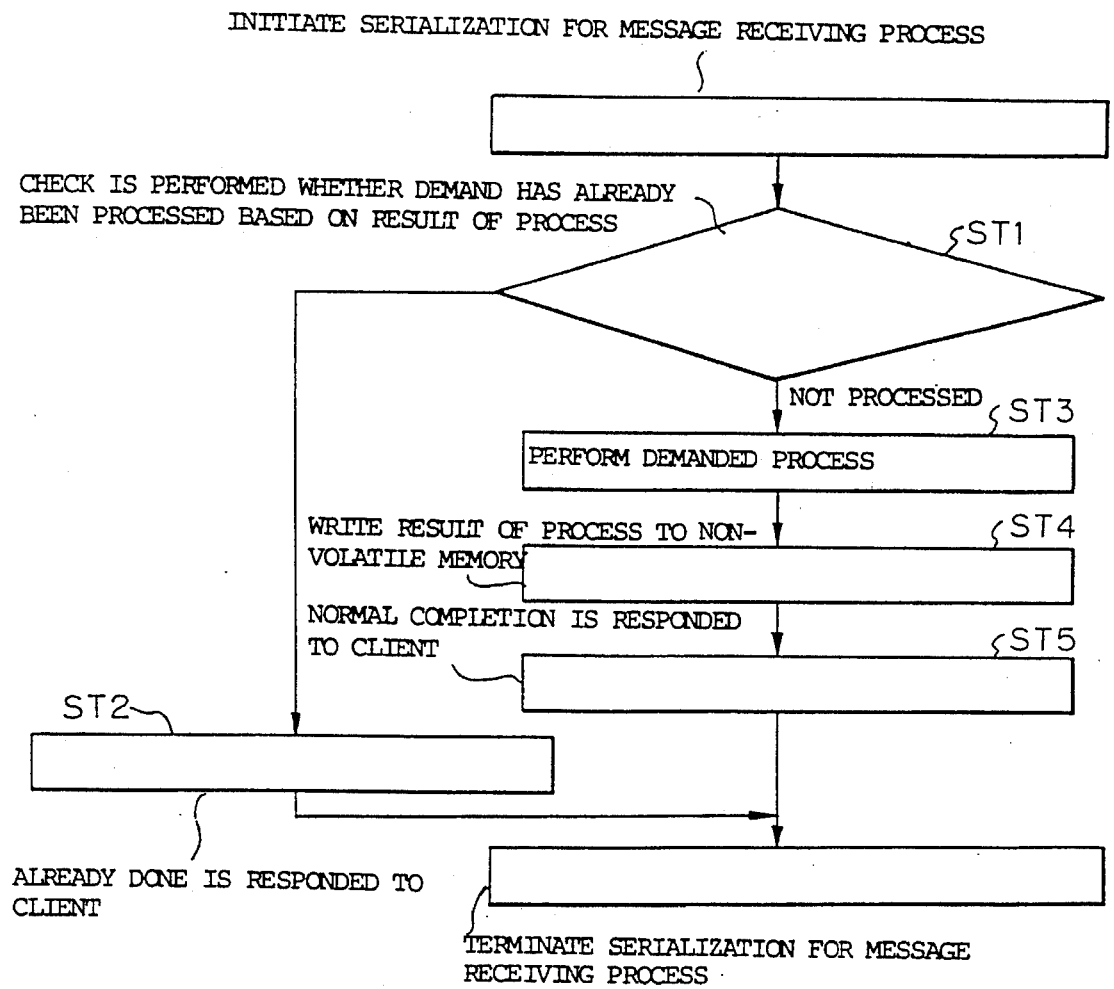
FIG. 4 is a flowchart showing process executed in a server in the first aspect.

Next, FIG. 4 is a flowchart showing a process to be executed by the server in the first type of process. Discussion will be given for the process when the message from the client 10 is received.

When the message from the client is received, the server 30, initially checks whether the demanded process from the client 10 has been completed by making reference to the volatile memory 36, as show in step ST1 of the flowchart of FIG. 4. According to checking process at the step ST1, if it is determined that the demanded process has already been completed, the process is advanced to step ST2 to issue a notice notifying that the process has already been completed to the client 10. On the other hand, when it is determined that the demanded process is not yet processed according to the checking process of step ST1, the process is advanced to step ST3, in which the demanded process is performed (executed by the server demand processing stage 302), then, at step ST4, the result of the process is written in the non-volatile memory for dealing with the server failure. Subsequently, at step ST5, a notice for normal, completion is issued to the client 10. Once the server failure occurs, upon resumption of processing after the failure, the process is performed to realize continuation of the process of message reception by recalling the management data of the result of the process maintained in the non-volatile memory 39 to the volatile memory 36.

Figure 5:
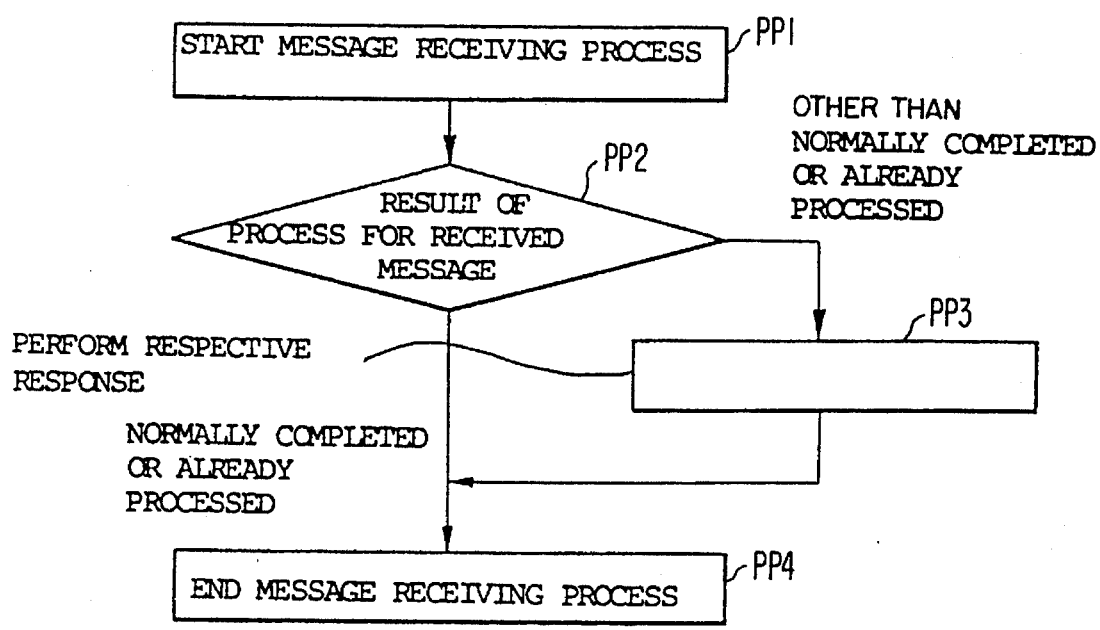
FIG. 5 is a flowchart showing process executed in a client in the first aspect.

FIG. 5 is a flowchart of the process executed by the client in the first aspect. Discussion will be provided for the process within the client when the notice indicating that the process has already been completed or the process has been normally completed. The client 10 processes to determine as normal, similar to reception of the notice of normal completion, when the notice that the process has already been done is received. See steps PP1–PP4.

Figure 6:
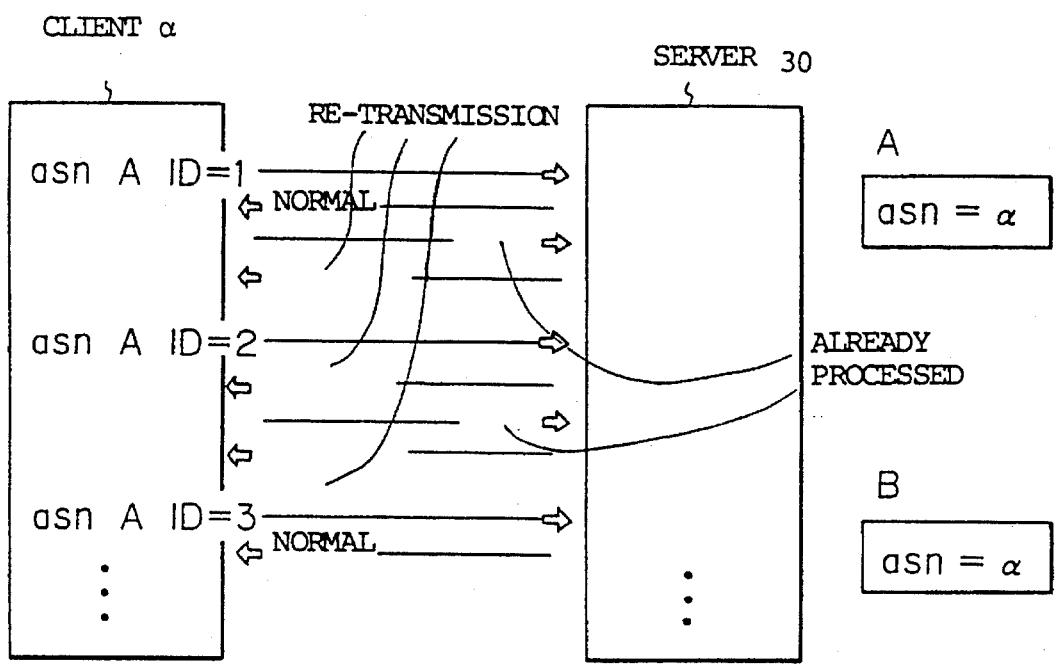
FIG. 6 is an explanatory illustration of the process of message communication in the first aspect.

FIG. 6 is an explanatory diagram showing process of the message communication in the first aspect. As shown, when the process "asn A" for assigning a resource A is normally processed by the server 30 if the "asn A" with the same demand ID is re-transmitted, the notice indicative of the done process is issued. Even when "asn A" with a different demand ID due to program error or so forth, is transmitted, the process is performed to issue the notice of done process.

As set forth above, according to the first aspect of the invention, since it becomes unnecessary to write the demand ID every time it receives new demands from the client, the overhead for realizing the server failure can be significantly reduced.

The second aspect will be discussed herebelow.

In the prior art, when data processing is executed though message communication between application programs, if a response to the transmitted message is absent, a decision is made whether the application program is down at the destination. By this, when data processing is executed based on the message communication, architecture in the prior art causes abnormal termination if the response to the message is absent.

However, when the destination of transmission of the message is a grovel or subservient service program which runs within a specific space in the system and encloses the system resource within the space to control the resource in the whole system, in order to prevent the service from being interrupted, the current system and the stand-by system are provided so that fault tolerance can be established by operating the stand-by system taking over the process when the current system is down. Therefore, the transmitter of the message should re-transmit the message because there is no possibility for the system being down even when no response to the transmitted message is received in the case when the destination of the message is the grovel service program.

Figure 16:
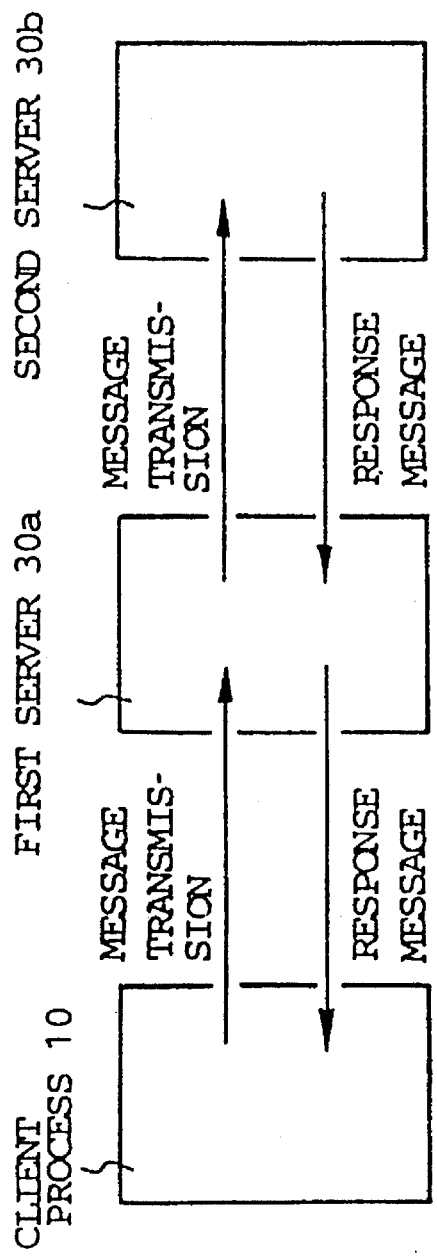
FIG. 16 is a schematic illustration showing communication between the client and the server in the second aspect.
Figure 17:
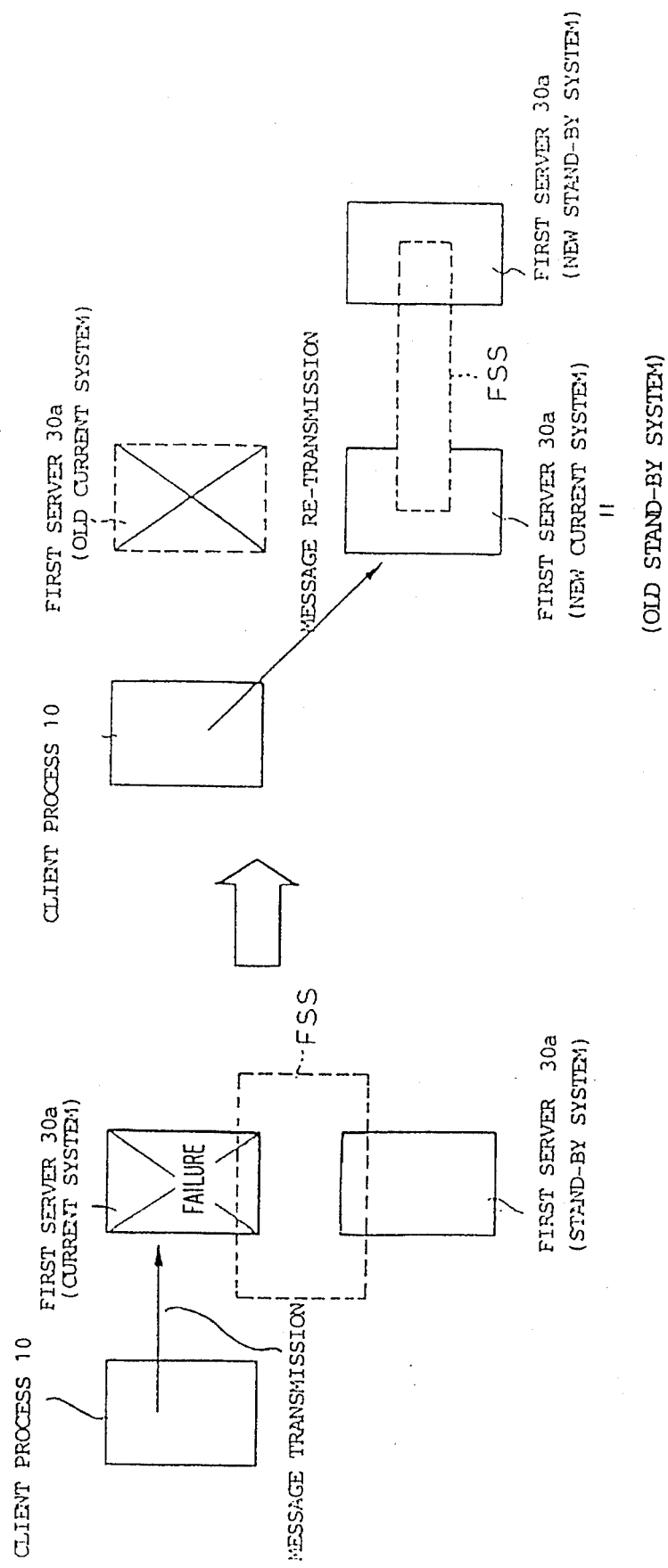
FIG. 17 is an explanatory illustration of the non-volatile memory between the client and server.
Figure 18:
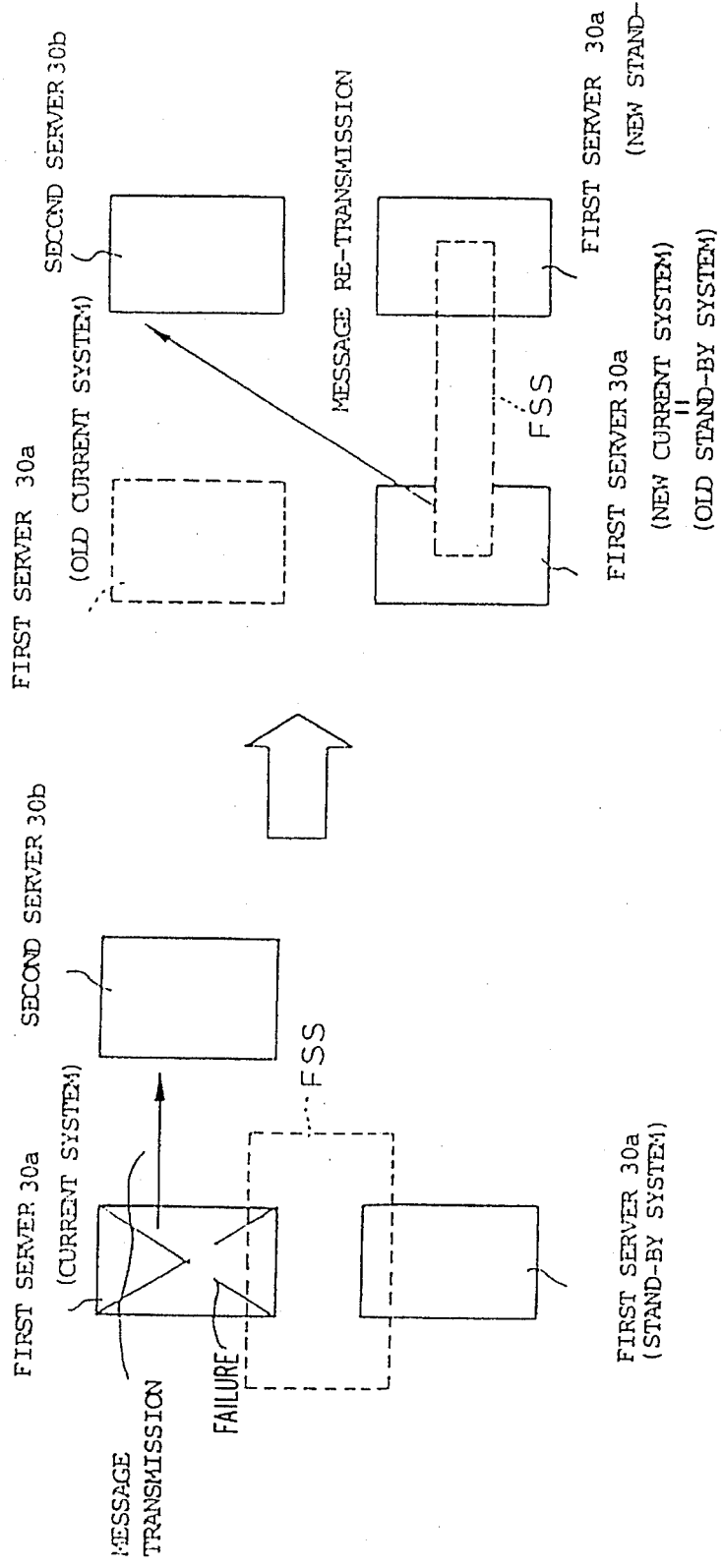
FIG. 18 is an explanatory illustration showing a non-volatile memory between the client and server in the second aspect.

FIG. 16 is a diagrammatic illustration of the client and server for discussion of the second aspect of the invention. FIG. 17 is an explanatory illustration of the non-volatile memory between the client and server. FIG. 18 is an explanatory illustration of the non-volatile memory between the servers. FIG. 16 shows the process of data processing by the client process 10, a first server 30a for receiving the service providing a demand from the client process 10 and a second server 30b which receives the service providing a demand from the first server 30a. In this case, the first and second servers 30a and 30b form the grovel service program. If a failure occurs at the first server 30a as the destination of transmission of the message, the client process 10 re-transmits the message for the new current system server 30a which takes over the process, as shown in FIG. 17. On the other hand, when the failure occurs at the first server 30a as the transmitter of the message, the new current first server 30a which takes over the process, re-transmits the message to the second server 30b as shown in FIG.18. If the failure occurs on the server 30b after transmission of the message from the server 30a to the server 30b, the server 30a returns the message to new second server 30b. Here, in the drawing, FSS represents a non-volatile specific memory area to be written in the information necessary for changing over the process 10 from the current system to the stand-by system.

In such construction of data processing, it becomes necessary to discriminate whether the transmitted message is for a new demand, re-transmitted demand or redundantly transmitted message. If the message is for a new demand, the demanded process has to be performed. In case of the re-transmitted message, judgement or a determination has to be made whether the demanded process has already been completed or not. On the other hand, in case of the redundantly transmitted message, since the process has already been performed, no process should be performed. From this, when fault tolerance is to be established by re-transmission of the message, it becomes necessary to proceed with a process for detecting re-transmitted and redundant messages at the receiver side.

On the other hand, when the first server 30a is designed so as to perform a process in which a resource is maintained therein, the received demand information has to be recorded in FSS for back-up in case of occurrence of the failure. However, when the first server 30a performs the process in which no resource is maintained, it becomes unnecessary to store the demand information in FSS by dealing with all demands transmitted from the client process 10 as new demands.

As is clear from this, it is unnecessary to apply the algorithm for detecting re-transmitted and redundant messages which are applicable for the in which no resourrce is maintained, for the process of the first server 30a, in which no resource should be maintained. Rather, if the same algorithm is applied, it may create the problem in that an unnecessary memory area of FSS is reserved and an unnecessary detection process for the re-transmitted message and redundantly transmitted message has to be performed to degrade the performance.

The second aspect of the invention has been established in view of the technical background as set forth above. The second aspect is intended to provide a novel message attribute detection system which can effectively detect the re-transmitted and redundant message from the process servers, in a data processing system which comprises a reception server for receiving the service demand from the client process and a plurality of process servers for providing service for the client process, and in which the reception server identifies the process server operating as service provider for providing a service to the client process.

Figure 10:
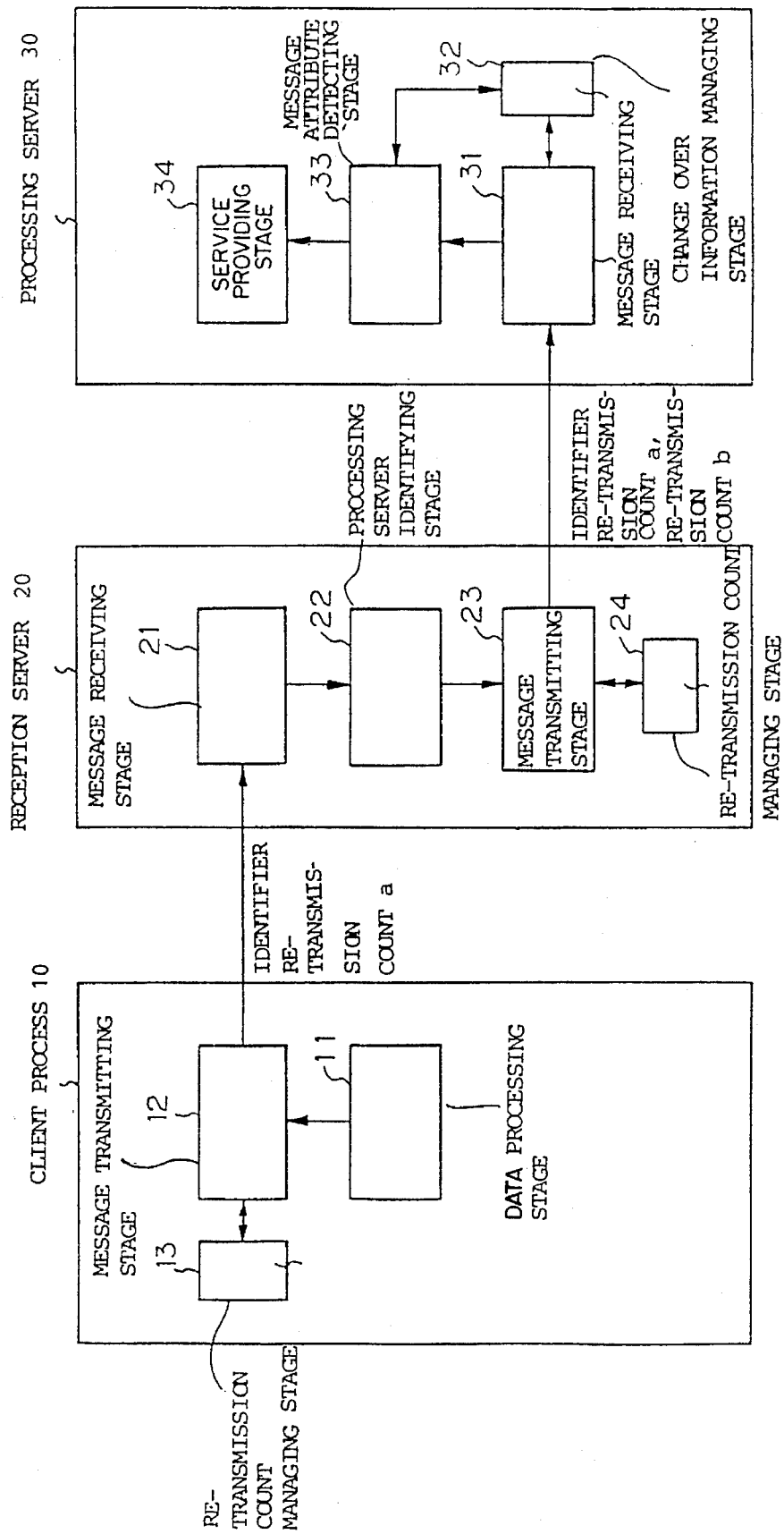
FIG. 10 is a basic block diagram of the second aspect of the present invention.

FIG. 10 shows the basic diagram of the second aspect of the invention.

In the drawing, the reference numeral 10 denotes the client process which performs predetermined data processing with a receiving service. The reference numeral 20 denotes the reception server which receives the service demand from the client process 10. The reference numeral 30 denotes a plurality of process servers, each of which provides a predetermined service for the client process 10.

The client process 10 comprises a data processing stage 11, a message transmitting stage 12 and a re-transmission count managing stage 13. The message transmitting stage 12 is responsive to the service demand issued from the data processing stage 11 to transmit the service demand message to the reception server 20. At this time, in the message transmitted, an identifier for identifying the message and a re-transmission count value of a representative of the rate of occurrence of re-transmission are added. The re-transmission count managing stage 13 manages the re-transmission count value correlating with the message identifier.

The reception server 20 comprises the message receiving stage 21, a processing server identifying stage 22, a message transmitting stage 23 and a re-transmission count managing stage 24. The message receiving stage 21 receives the service demand message from the client process 10. The processing server identifying stage 22 identifies the process server 30 which becomes a service provider for the service required in the received service demand message. At this time, the transmitted message increases or increments the identifier and an identifier re-transmission count value (a) and a re-transmitted count value (b) representative of the rate is added to the message transmitted in the occurrence of re-transmission from the reception server 20. The re-transmission count managing stage 24 manages this re-transmission count value b in correlation with the message identifier.

As set forth above, the reception server 20 performs a process for identifying the processing server 30 which can be a service provider for the service required in the client process 10. Therefore, the process is not executed in a manner to maintain the information, such as writing information on a disk and so forth. From this, the reception server 20 takes the architecture for dealing or receiving service demand messages transmitted from the client process 10 as new demands irrespective of re-transmitted messages and redundantly transmitted messages and thus neglects storing the information for changing over the process.

The process server 30 includes a message receiving stage 31, a change over information managing stage 32, a message attribute detecting stage 33, and a service providing stage 34. In the message receiving stage 31, the service demand message transmitted from the reception server is received. The change over information managing stage 32 maintains information, such as the identifier and two kinds of re-transmission count values a and b and so forth added to the received message as changing over information, in a non-volatile fashion. The message attribute detecting stage 33 compares the identifier added to the received message with the identifier stored in the change over information managing stage 32 to discriminate whether the received message is for a new demand or not. When the received demand is not new, discrimination is made whether the received message is a re-transmitted message or the redundantly transmitted message by comparing the re-transmission count values (a) and (b) which are provided for the received message, with the corresponding held value in the change over information managing stage 32, which is recalled in the volatile memory. The service providing stage 34 performs the process for providing the service for the client process in response to the result of detection of the message attribute detecting stage 33.

In the second aspect of the present invention, the message attribute detecting stage 33 in process server 30, initially makes a discrimination whether the identifier given to the received message is stored in the change over information managing stage 32. By this discrimination process, if discrimination is made that the identifier is not stored, judgement is made that the received message is for a new service demand. On the other hand, when discrimination is made that the identifier has already been stored, then, subsequent discrimination is performed to determine whether the re-transmission count value (a) given for the received message is greater than the stored value held in the change over information managing stage 32, or smaller.

The message attribute detecting stage 33 decides whether the received message is a re-transmitted message when the re-transmission count value (a) of the received message is greater than the stored value. On the other hand, when the re-transmission count value (a) is smaller than the stored value, then it is decided that the received message is a redundantly transmitted message. When the re-transmitted count value equals the stored value and is detected, discrimination is performed whether the re-transmission count value (b) of the received message is greater or smaller than the stored value held in the change over information managing stage 32.

Through this process, the message attribute detecting stage 33 determines that the received message is a re-transmitted message when the re-transmission count value (b) is greater than the stored value, and that the received message is a redundantly transmitted message when it is smaller than or equal to the stored value.

As set forth above, in the second aspect of the present invention, in view of the characteristics of the process in which the server 20 does not perform the process in which a resource is maintained therein the reception server 20 deals with all of the service demand messages transmitted from the client process 10 as new demands, and thus will not make a discrimination whether the message is a re-transmitted or redundantly transmitted. Also, recording the change over information for FSS is neglected or omitted. The processing server 30 architecture makes a discrimination whether the received message is a re-transmitted message or a redundantly transmitted message based on the two kinds of the re-transmission count values (a) and (b) of the transmitted message. Therefore, it is possible to effectively detect the re-transmitted messages and the redundantly transmitted messages with reduced dynamic steps and with reduced memory capacity.

Hereafter one embodiment of the second aspect of to the invention will be discussed in detail.

Figure 11:
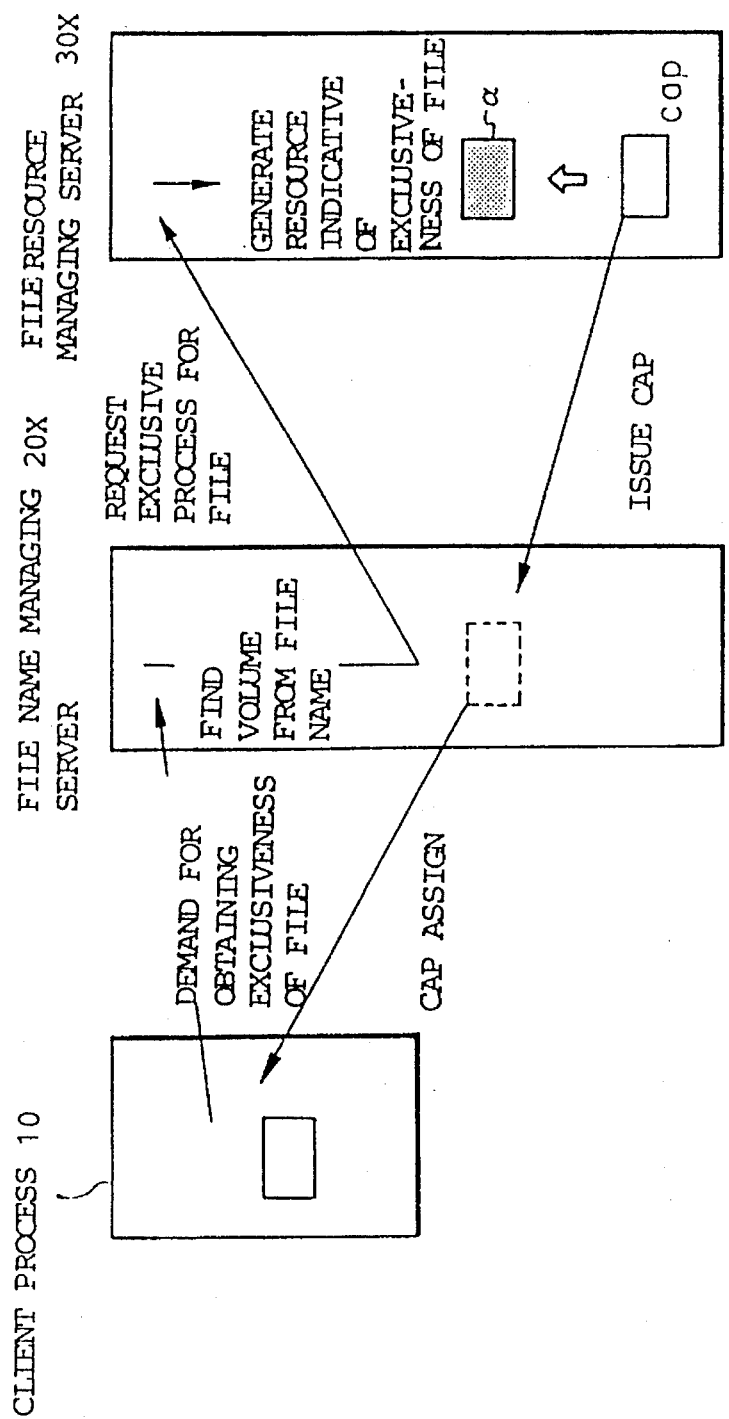
FIG. 11 is a block diagram showing construction of the distributed processing system in the second aspect.

FIG. 11 shows the structure of the distributed process system applicable to the second aspect of the invention. In FIG. 10, the reference numeral 10 denotes the client process discussed with respect to FIG. 10. The reference numeral 20x denotes a file name managing server which manages file names and correlation of the file names and the values in which the files exist, for all of the files in the system. The reference numeral 30x denotes a file resource managing server corresponding to each volume, which performs a managing process for a file resource, such as issuance process of a handling right for using a file in the volume. The file name managing server 20x and the file resource managing server 30x are provided in the current system and stand-by system in view of a failure. Though it is neglected in the drawings, the file resource managing server 30x is provided with the above-mentioned FSS as a special storage area for storing the information necessary for changing over the process to the stand-by system.

As shown, the client process 10 receives the demand message for authorization for handling the file with respect to the file name managing server 20x. The file name managing server 20x is responsive to this message to identify the volume where the file demanded to obtain handling authority exists, and transmit a demand message for issuance of authority for handling the file for the file resource managing server 30x, which manages the file handling authority of the identified volume. When this message is received, the file resource managing server 30x issues a capability ("cap" in the drawings) of the file handling authority for the file name managing server 20x. The file name managing server 20x assigns this capability of the file handling authority to the client process 10. Once the file handling authority is obtained, the client process 10 performs a process to directly demand the opening of the exclusively obtained file resource (α in the drawing) directed by the assigned capability and the demand for a reference process.

In such process, the client process 10 performs a process for re-transmitting a demand message for obtaining a file handling authority in view of possible occurrence of a failure of the file name managing server 20x and taking over the process by the stand-by system. Also, the file name managing server 20x re-transmits the demand message for issuance of the authority or permission for handling the file, in view of the possible occurrence of a failure of the file resource managing server and take over of the process by the stand-by system. Therefore, the file resource managing server 30x needs to have a means for detecting the re-transmitted message and a means for detecting the redundant message for the performed process transmitted with delay for the same reason.

Figure 12:
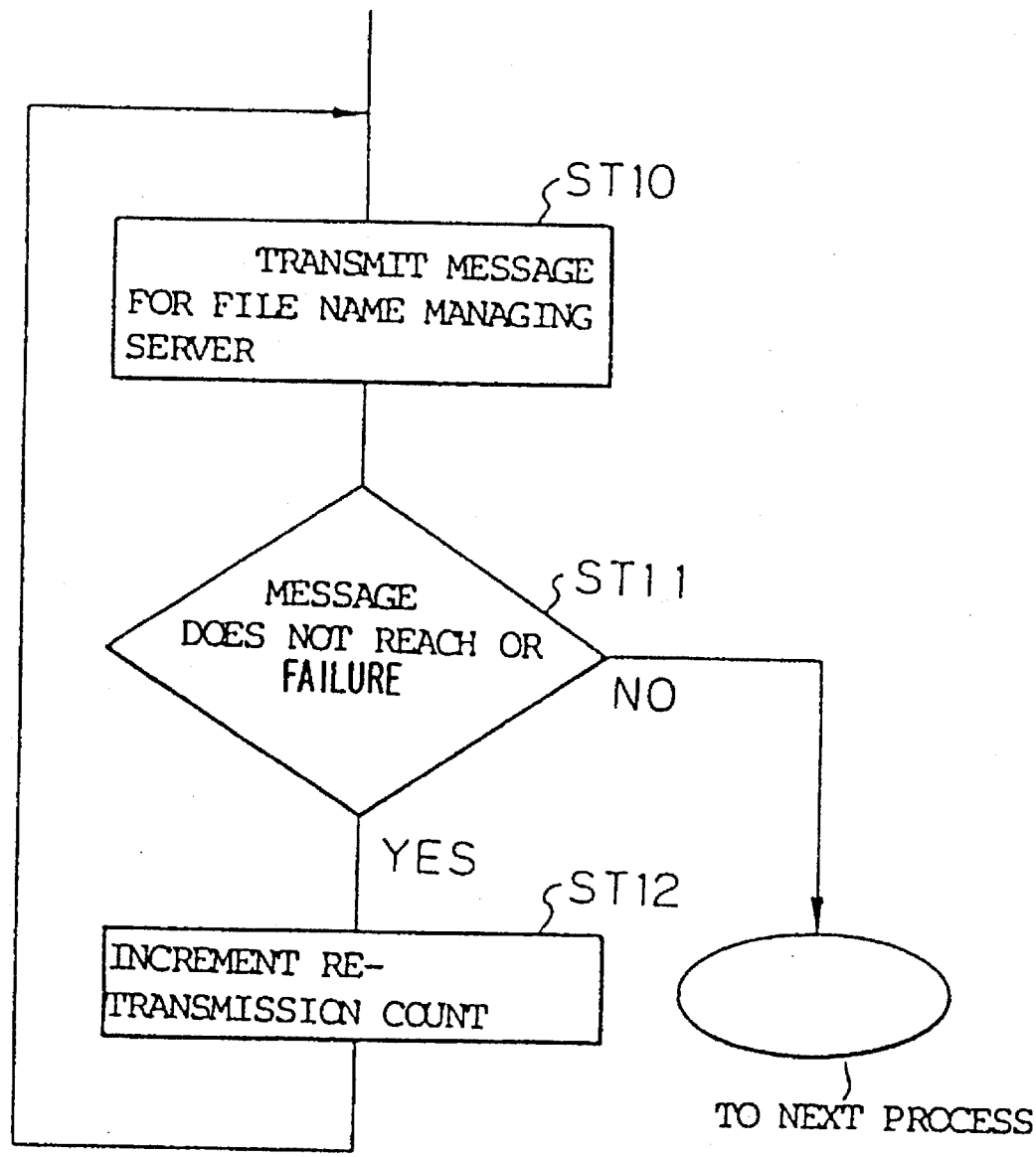
FIG. 12 is a flowchart showing the process executed in the client in the second aspect.
Figure 13:
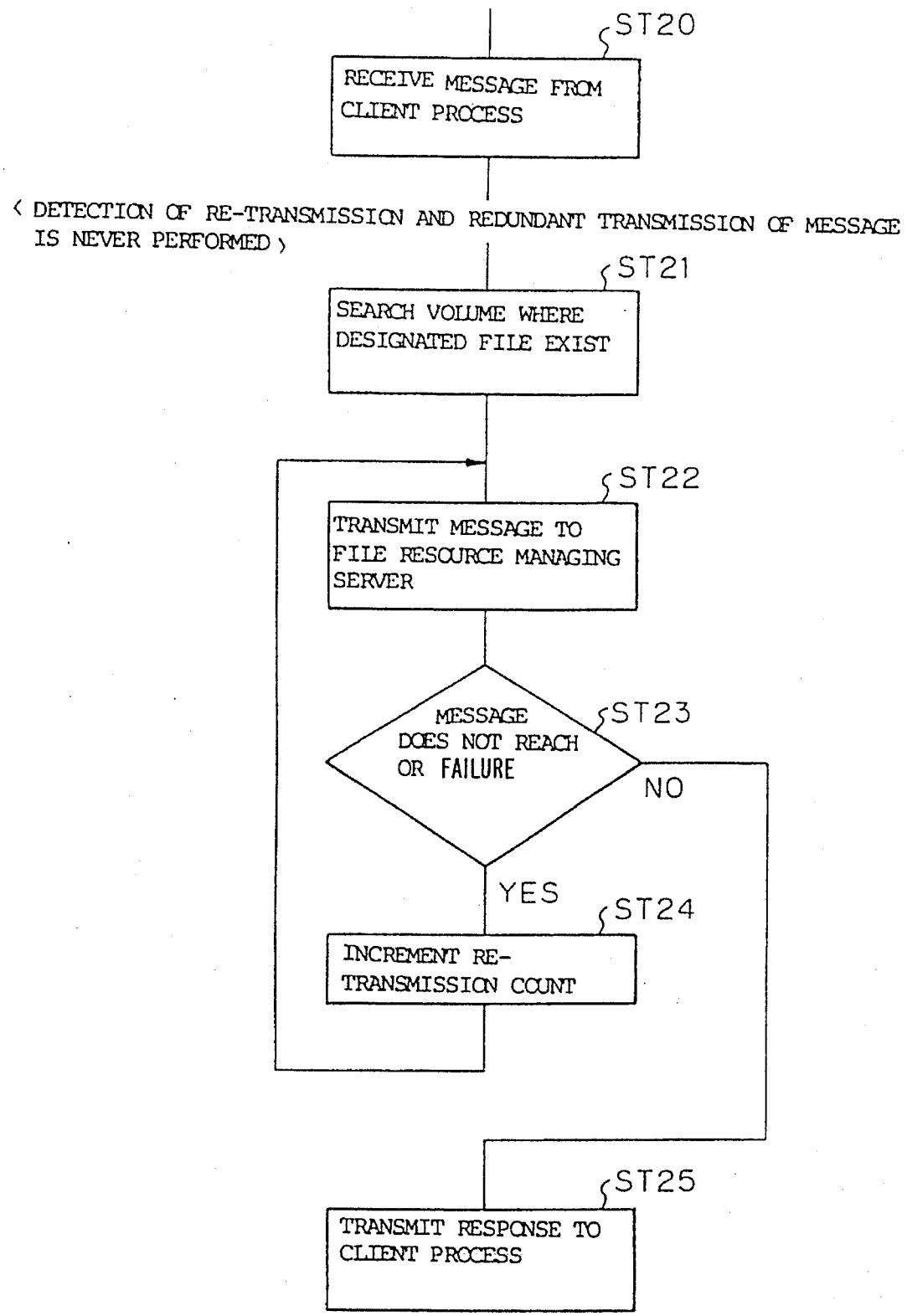
FIG. 13 is a flowchart showing the process executed by each file managing server in the second aspect.
Figure 14:
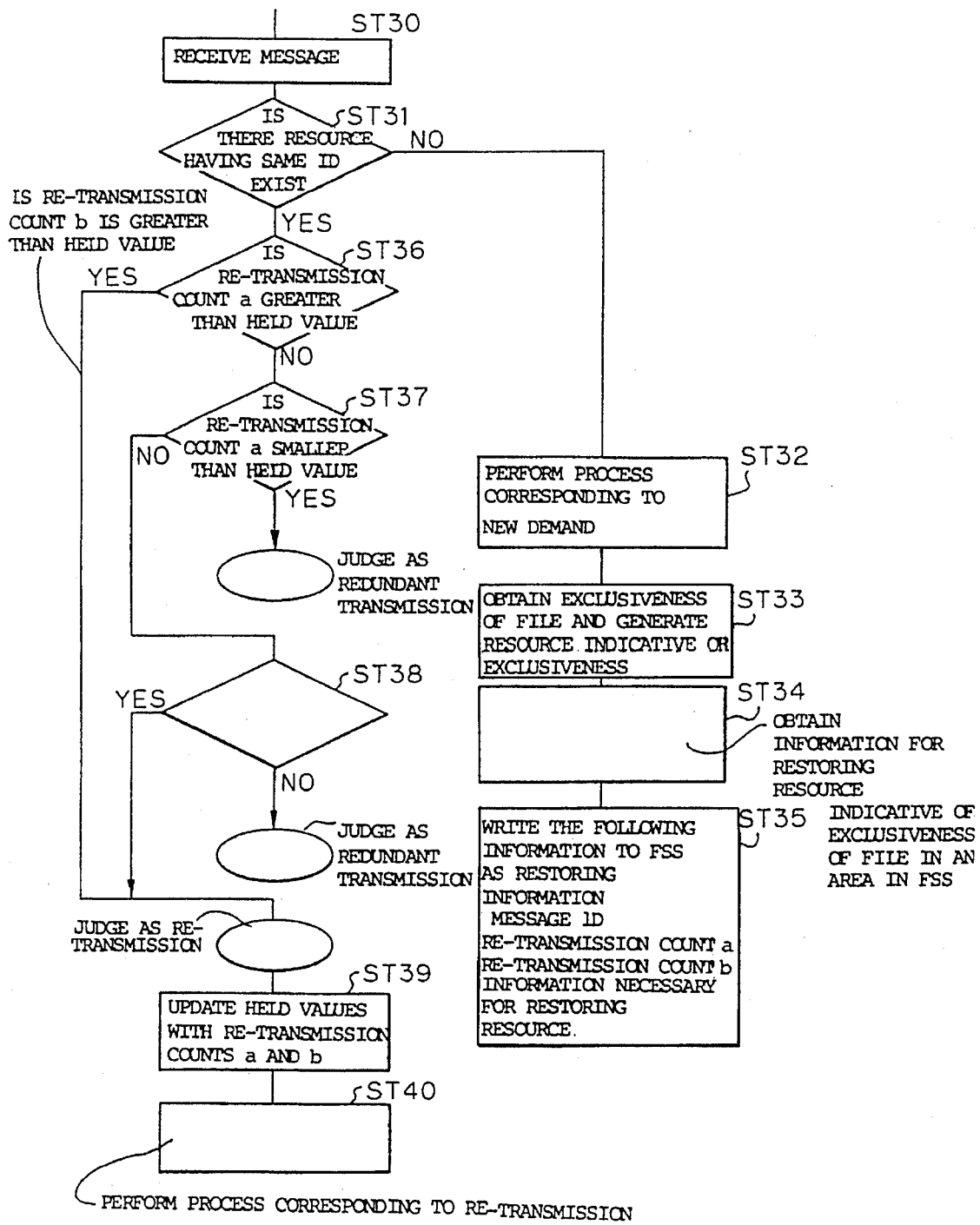
FIG. 14 is a flowchart showing the process executed by a file source managing server in the second aspect.

FIG. 12 is a flowchart of the process executed by the client in the second aspect of the invention. FIG. 13 is a flowchart of the process executed by the file name managing server. FIG. 14 is a flowchart of the process executed by the file resource managing server. According to the flowcharts of FIGS. 12 to 14, a detailed discussion will be given for the detecting process for the re-transmitted and redundant messages in the second aspect of the invention.

The client process 10 transmits demand messages for obtaining a file handling authority to the file name server 20x, as shown in the step ST10 of the flowchart of FIG. 12. At this time, the client process 10 sequentially adds the message ID and also adds the re-transmission count value (number of re-transmission as discussed in FIG. 10). Subsequently, at step ST11, when the transmitted message has not reached or the file name managing server 20x has failed, and is detected by the message server which is not shown, at step ST12, the client process 10 performs a process to increment a count value of a counter which manages the number of re-transmissions and transmits the demand message for obtaining the file handling authority.

Figure 15:
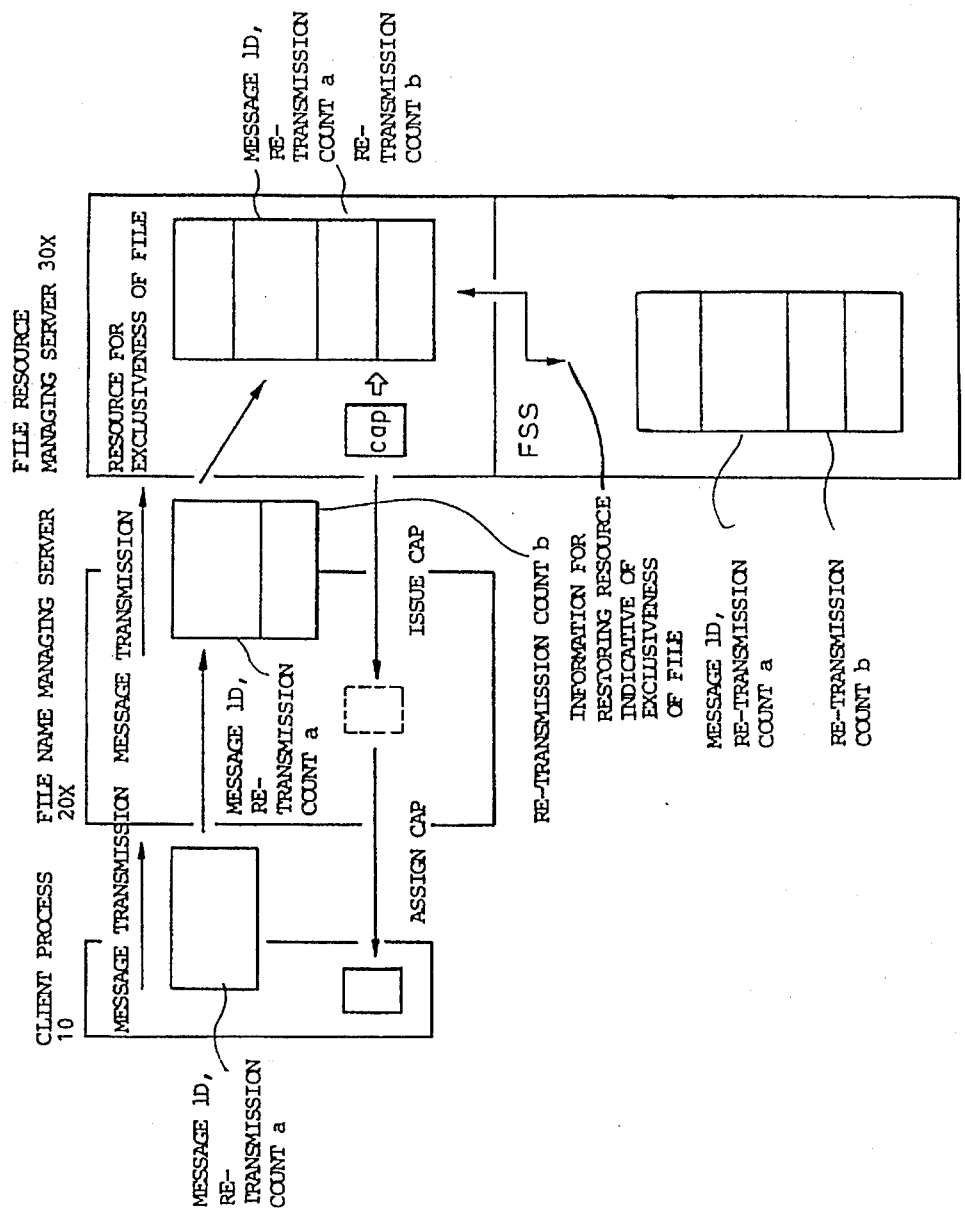
FIG. 15 is an explanatory illustration of the basic process in the second aspect.

FIG. 15 is an explanatory illustration showing the basic process in the second aspect of the invention. As shown, in the message transmitted from the client process 10 to the file name managing server 20x, the message ID and the re-transmission count value (a) are added.

When the demand message for obtaining the file handling authority is received from the client in step ST20 of FIG. 13, the file name managing server 20x instantly advances the process to step ST21 without detecting the re-transmission or redundant transmission, to identify the volume where the designated file exists. Then, at step ST22, a demand message for issuance of the file handling authority is transmitted to the file resource managing server 30x which manages the file handling authority of the identified volume. At this time, the file name managing server 20x adds the message ID and the re-transmission count value (a) transmitted from the client process 10 and adds the re-transmission count value (b) number of re-transmission as discussed in FIG. 10.

Subsequently, at a step ST23, with respect to the message transmission process, if the message has not reached or a failure is occurring at the file resource managing server 30x and is detected by the message server, which is not shown, then the re-transmission count value of a counter, which manages the number of re-transmissions is incremented (the re-transmission count value (b) is incremented) at step ST24. Thereafter, the process returns to step ST22 to again transmit the demand message to issue the file handling authority to the file resource server, again. On the other hand, when reaching the message is confirmed at step ST23, a process for responding to the message is performed for the client process 10, at step ST25.

Through this, as shown in FIG. 15, in the message transmitted from the file name managing server 20x to the file resource managing server 30x, the re-transmission count value (b) representing the number of message re-transmissions is added in addition to the message ID and the re-transmission count value (a) transmitted from the client process 10.

The file resource managing server 30x receives the demand message for the issuance of the file handling authority from the file name managing server 20x in step ST30 of FIG. 14. The discrimination as shown in the step ST31 of the flowchart of FIG. 14, is made whether the file handling authority having the same message ID has already been registered or not. As shown in FIG. 15, this discrimination process is performed by searching the stored information of FSS which is recalled in the volatile memory. When it is determined that the file handing authority has not yet been registered for the transmitted message ID according to the discrimination process, then the process is advanced to step ST32 to perform a new demand process. Then, at step ST33, an exclusive file is obtained and a resource is established. At step ST34, an area in the FSS is reserved for writing restoration information. Then, at step ST35, the message ID, the re-transmission count value (a) and the re-transmission count value (b) of the transmitted message are written in the reserves area in the FSS. Also, other information which becomes necessary for restoration is written in. Once the file handing authority is obtained through the process set forth above, the file resource managing server 30x performs a process for providing capability for the client process 10 via the file name managing server 20x, as shown in FIG. 15.

On the other hand, according to the discrimination process at the step ST31, when it is determined than the file handling authority for the transmitted message ID has already been registered, the process is advanced to step ST36, and discrimination is made whether the re-transmission count value (a) is greater than the re-transmission count (a) set with the file handling authority or not. If greater, it is determined that the message has been re-transmitted. On the other hand, when discrimination at step ST36 shows that the re-transmission count value (a) is not greater than the set re-transmission count, then, the process is advanced to step ST37 to discriminate whether the re-transmission count value (a) of the current transmission is smaller than the re-transmission count (a) set with respect to the file handling authority, or not. If smaller, it is determined that the received message is a redundantly transmitted message. On the other hand, at step ST37, if the transmitted re-transmission count value (a) is equal to the re-transmission count (a) set with respect to the file handling authority, then, the process is advanced to step ST38, in which a discrimination is made whether the re-transmission count value (b) is greater than the re-transmission count (b) set with respect to the file handling authority. If greater, it is determined that the message is re-transmitted. Otherwise, equal or smaller, it is determined that the received message is a redundantly transmitted message.

The file resource managing server 30x terminates the process without conducting a process since the process has already been performed, when the judgement is made that the message is the redundantly transmission one. On the other hand, if it is determined that the message is re-transmitted, the process is advanced to step ST39 to update the re-transmission counts (a) and (b) stored in the FSS by re-writing. Subsequently, at step ST40, a process corresponding to the re-transmitted message is performed. Namely, the process is conducted as potentially the same process that has already been performed. When it is confirmed that the same process has been performed, the process is terminated. On the other hand, when it is confirmed that the same process has not yet been performed, the process is continued.

Through the process set forth above in the second aspect of the invention, since the file name managing server is not necessary to make a judgement of the re-transmission and redundant transmission, the file handling authority can be provided for the client process 10 at high speed.

As set forth above, by employing the second aspect of the invention in the data processing process in which the client process makes a call for the reception server, and the reception server makes a call for the processing server, and in the case that the reception server will not leave the resource, the re-transmission and redundant transmission processing adapted for such process can be realized. By this, the re-transmitted message and the redundantly transmitted message can be effectively detected with reduced dynamic steps and with reduced memory capacity.

The third aspect of the invention will be discussed herebelow. In the prior art, when the message communication is used as a communication means between programs, if the program as the destination of the message is a service program which runs in a specific space in the system and encloses the system resource to control the overall resource of the system, namely, the global service (GS), a message drop out has been prevented by using an automatic message re-transmitting function. Here, the automatic message re-transmitting function is a function to perform a re-transmission of the message when the current GS as the destination of the message, namely the current GS at the receiver side, is down, after the stand-by GS is re-started.

The GS at the receiver side stores the message identifier in the non-volatile memory every time the message is re-transmitted, and compares the message identifier of the newly received message with the stored message to distinguish the new message from the re-transmitted message.

In the present invention, the current GS and the stand-by GS are regarded as single GS. Also, when the current GS is down, the stand-by GS takes over the process.

However, in the conventional system, since the message identifier has not been stored in a form commonly used by the current GS and the stand-by GS, when a down system occurs at the message transmitter side, the message identifier used for transmitting the message can be lost and the stand-by system which takes over the process, transmits the message by adding the message identifier which is different from that transmitted from the current system.

Therefore, the conventional system encounters a drawback, in that, when the transmitter side GS is re-started, namely the re-transmitted message transmitted by the transmitter side stand-by GS, the receiver side GS cannot recognize the re-transmitted demand and can possibly cause loss of the message or redundant transmissions.

The third aspect of the invention is intended to solve the above-mentioned drawback. Particularly, the object of the third aspect of the invention is to assure prevention of loss of the message and detection of redundant transmissions between GS which uses a multi-demand ID and re-transmission counter, by that the stand-by GS makes a reference to the content, such as a message identifier, stored in the non-volatile memory to add an identifier indicative of re-transmission of the message when the transmitter side current GS is down, for preventing loss of the message and detecting redundant transmissions.

Figure 19:
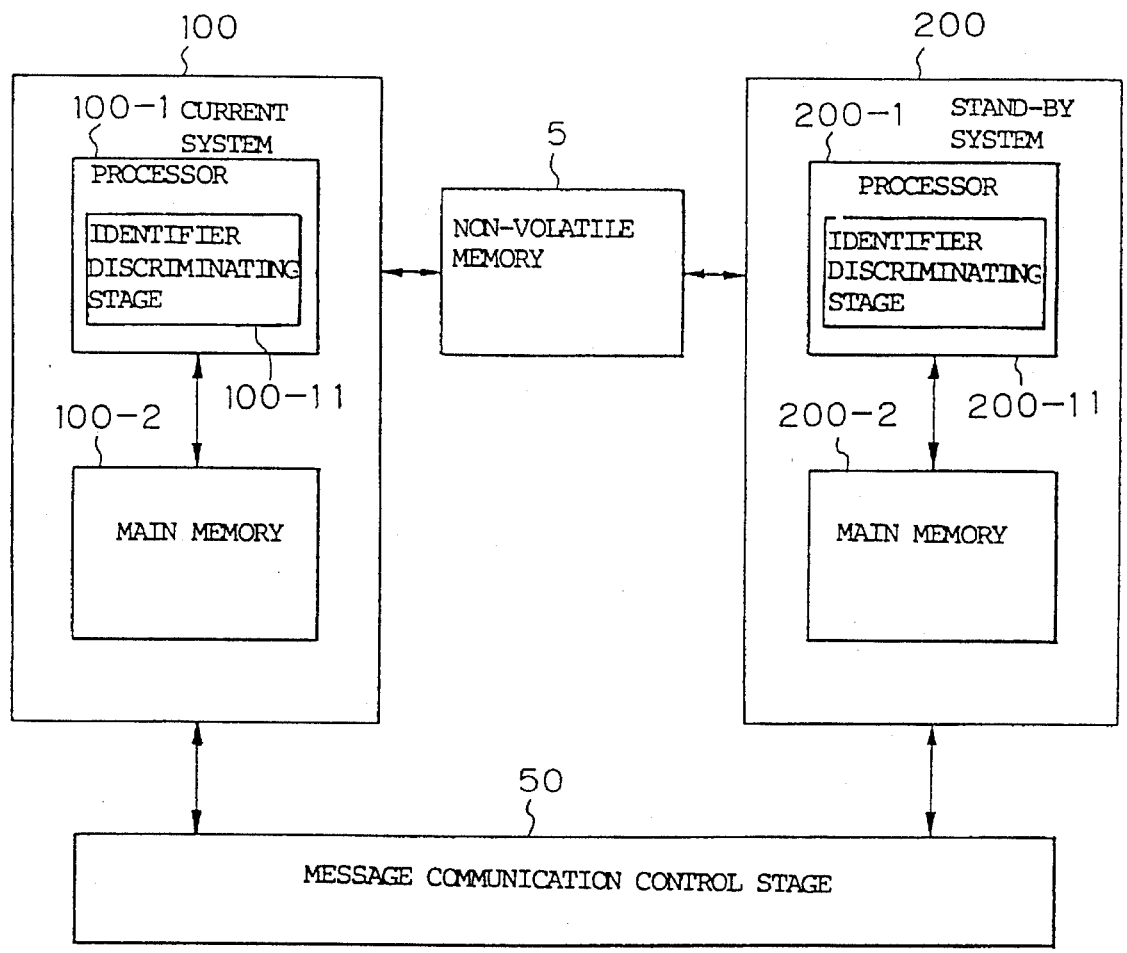
FIG. 19 is a basic block diagram of the third aspect of the present invention.
Figure 20:
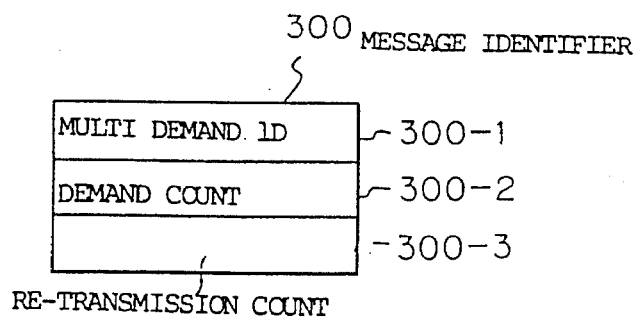
FIG. 20 is an explanatory illustration showing a message identifier in the third aspect.

FIG. 19 is a basic diagram of the third aspect of the invention. FIG. 20 is an explanatory illustration of the message identifier in the third aspect.

In the drawings, the reference numeral 100 denotes a current system. In the normal state, the content of the message communication is received from the current system. Particularly, in the case that the program as the destination of the message is above-mentioned GS, the message communication is performed by adding the message identifier as discussed later. The reference numeral 100-1 denotes a processor, which belongs in the current system 100. The reference numeral 100-2 denotes a main memory, which belongs in the current system. The reference numeral 200 denotes a stand-by system, which takes over the process in place of the current system when the current system is down. The reference numeral 200-1 denotes a processor that belongs in the stand-by system. The reference numeral 200-2 denotes a main memory, which belongs in the stand-by system. The reference numerals 100-11 and 200-11 denotes an identifier discrimination processing stage that discriminates whether the message identifier is the same or different. The reference numeral 5 denotes the non-volatile memory which can be commonly accessed by the current system 100 and the stand-by system 200. When the destination program to send the message is GS, the non-volatile memory 5 stores the content of the later discussed message identifier in conjunction with the content of the message to be communicated. The reference numeral 50 denotes the message communication control stage. When the current system 10 100 is down and the stand-by system 200 initiates operation, communication is normally performed by using an automatic re-transmission function for the message provided by a supervisor. However, when the program for the message destination is shown by "GS", the function of the message automatic re-transmission is not used and the re-transmission of the message is performed between the GSs in the transmission/reception.

In FIG. 20, when re-transmission of the message is performed using the logic between the GS for communication therebetween, the shown message identifier 300 is always added. Both the transmitter side and the receiver side GS stores the message identifier 300 in the non-volatile memory 5.

The message identifier 300 comprises identifiers of a multi demand ID 300-1, a demand counter 300-2 and a re-transmission counter 300-3. The identifier performs the following functions and the method of use is discussed as follows.

The multi demand ID 300-1 designates a communication path. Namely, based on the logic of the transmitter side GS, an ID is assigned for every demand. At the transmitter side GS, in order to process a plurality of demands simultaneously, it is necessary at the receiver side to process a plurality of demands simultaneously. Therefore, in order to assign the communication path for each demand, the multi demand ID is used. In order to control expansion of the capacity of the non-volatile memory 5, at the transmitter side GS, when the demand including a re-transmission demand is completed, namely when the response indicative of reception of the message from the receiver side GS is received, the multi demand ID 300-1 will be used for other demands.

On the other hand, at the receiver side GS, there is provided areas for storing the content of the message for each of the multi-demand IDs. Namely, in order to prevent this storage area from increasing, the multi demand ID is used repeatedly.

The demand counter 300-2 represents the order of the demand in the communication path determined by the multi demand ID 300-1 in a straightforward fashion. When one demand is completed and a new demand is to be processed, the transmitter side GS transmits a message by adding "1" to the counter value.

On the other hand, at the receiver side GS, if the message having a counter value greater than the immediately preceding counter value is received, the process performed is regarded as a new demand.

The re-transmission counter 300-3 represents the number of occurrences of re-transmission for one demand. At the transmitter side GS, "0" sets forth a new demand, and the counter value is incremented by "1" for every occasion of re-transmission.

On the other hand, at the receiver side GS, when the counter value of the received message is greater than the immediately preceding counter value, the process performed is regarded as a re-transmitted demand.

The communication path between the transmitter side GS and the receiver side GS is specified by the content of the multi demand ID 300-1, and for each communication path, the content of messages, particularly the message identifiers 300 are stored in the non-volatile memory at both the transmitter side and the receiver side.

Accordingly, even when the transmitter side GS is down, the stand-by system 200 can make the message identifier 300 stored in the non-volatile memory reference from a new message identifier and then transmit to the receiver side GS though the communication control stage 50 together with the message. At the receiver side GS, by comparing the content of the new message identifier 300 with the content of the immediately preceding old message identifier 300, discrimination for the newly re-transmitted message can be performed. This enables prevention of the loss of messages and detection of redundant transmissions.

Figure 21:
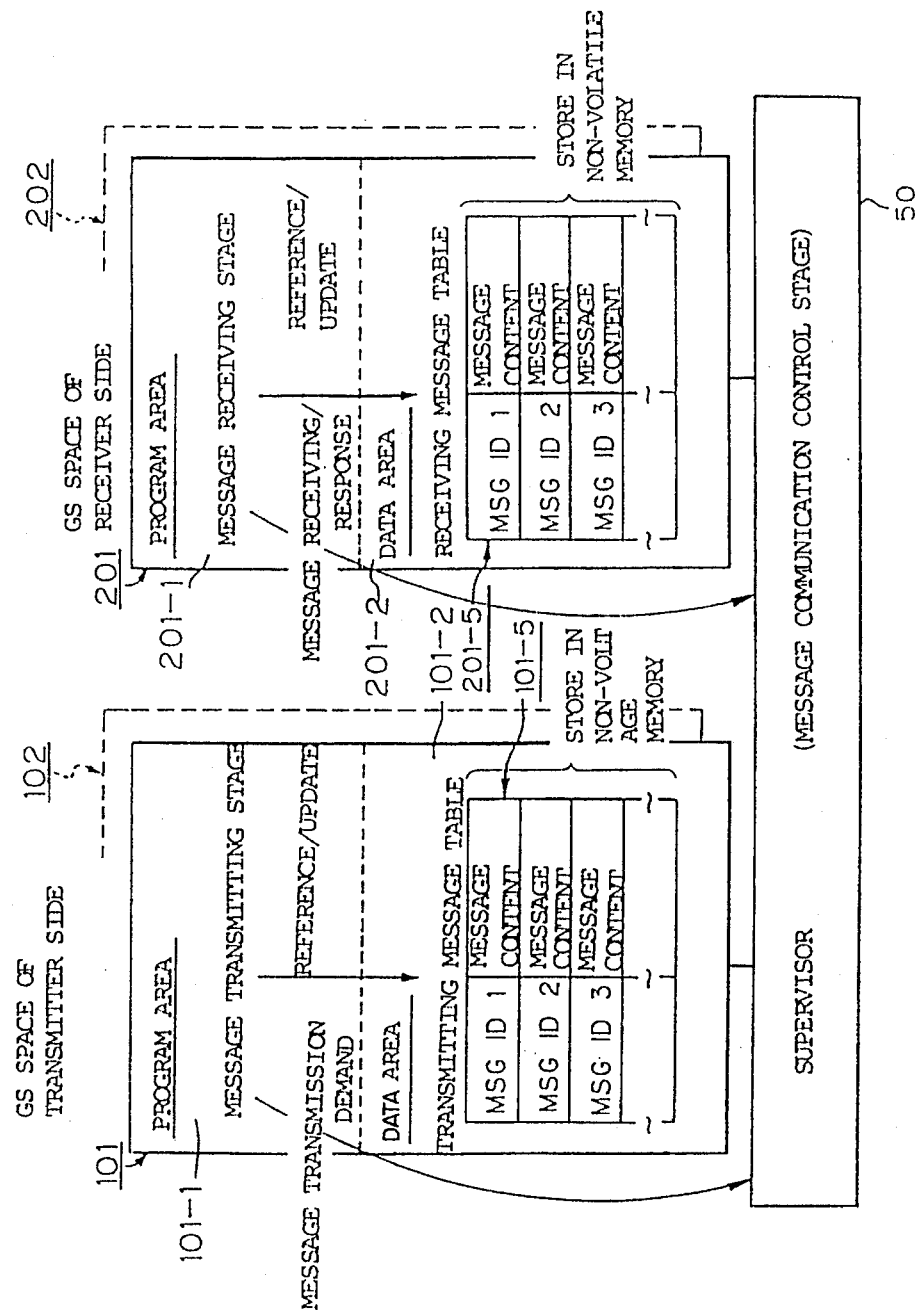
FIG. 21 is a exemplary block diagram of the structure of the third aspect of the invention.

FIG. 21 shows the diagram of the third aspect of the invention. The reference numeral 101 denotes GS space at the transmitter side current system. The reference numeral 101-1 denotes a program area. The reference numeral 101-2 denotes a data area. The reference numeral 101-5 denotes a transmitting message table. The reference numeral 102 denotes a GS space for the transmitter side stand-by system. The reference numeral 201 denotes a GS space for the receiver side current system. The reference numeral 201-1 denotes a program area. The reference numeral 201-2 denotes a data area. The reference numeral 201-5 denotes a receiving message table. The reference numeral 202 denotes a GS space for the receiver side stand-by system. The reference numeral 50 denotes a supervisor of the message communication control stage.

For the message identifier MSG ID1 to MSG ID3, three identifiers as shown in FIG. 20 are contained for each message identifier MSG ID.

In FIG. 21, the GS space 102 for the transmitter side stand-by system and the GS space 202 for the receiver side stand-by system are to be started and generated when the GS space 101 of the transmitter side current system or the GS space 201 of the receiver side current system goes down. These can be considered as not existing in the normal operation.

On the other hand, in the instant drawing, the remaining reference numerals can be considered to correspond to the reference numerals of the hardware of FIG. 19.

Although FIG. 21 does not illustrate the non-volatile memory 5 shown in FIG. 19, the non-volatile memory 5 exists commonly to store the contents of the transmitting message table 101-5 and the receiving message table 202-5.

Figure 22:
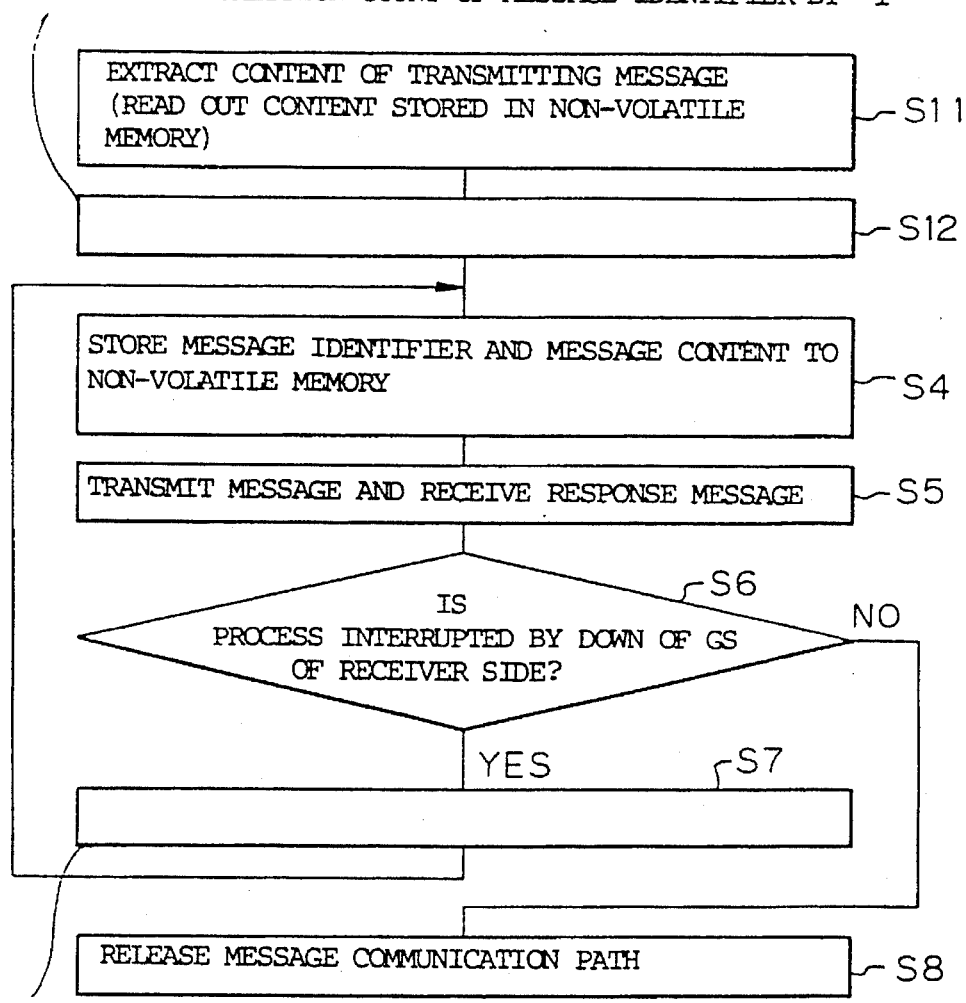
FIG. 22 is a flowchart showing a message re-transmission process after re-starting of a transmission side server, in the third aspect.
Figure 23:
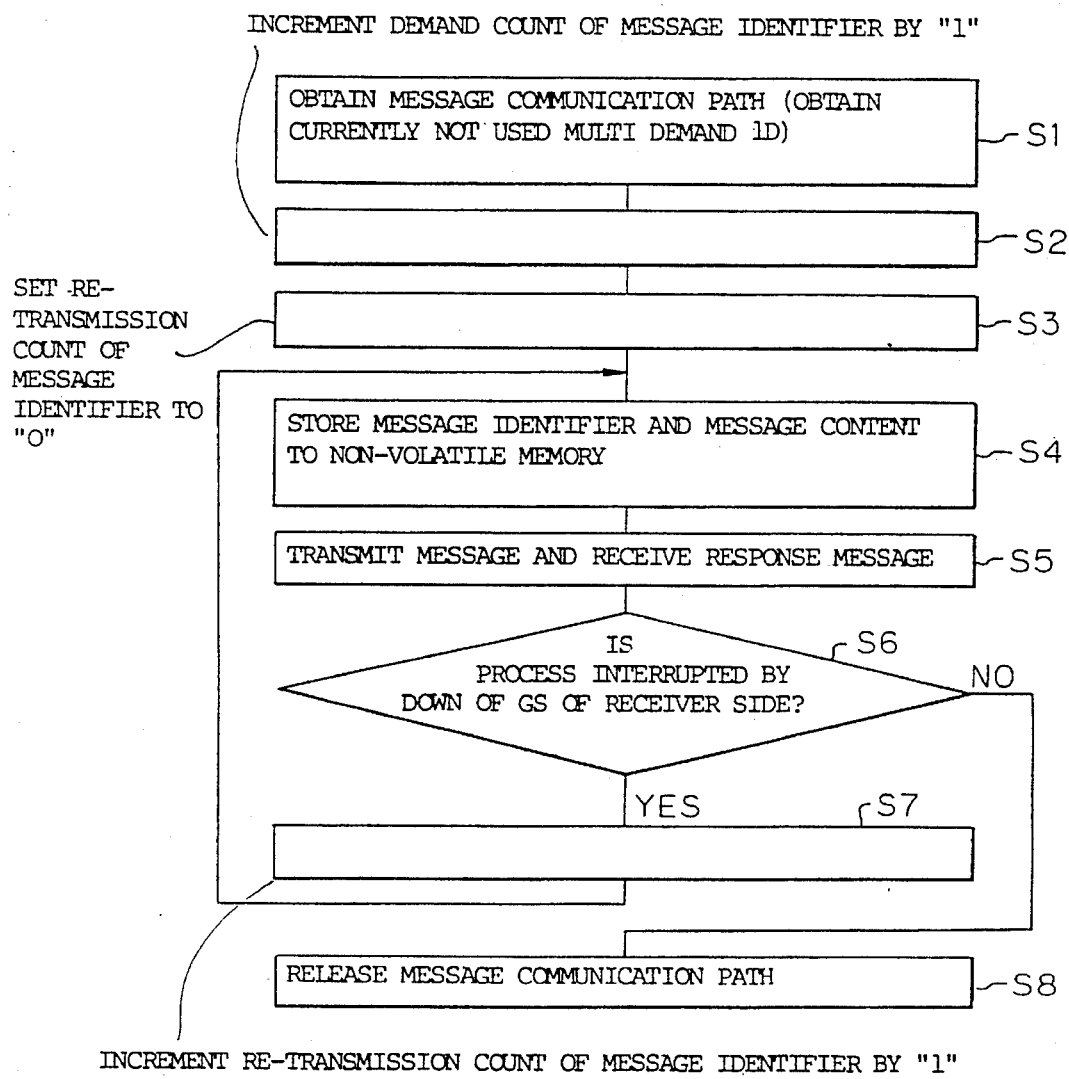
FIG. 23 is a flowchart showing a message transmission process in a transmission side server in the normal process in the third aspect.
Figure 24:
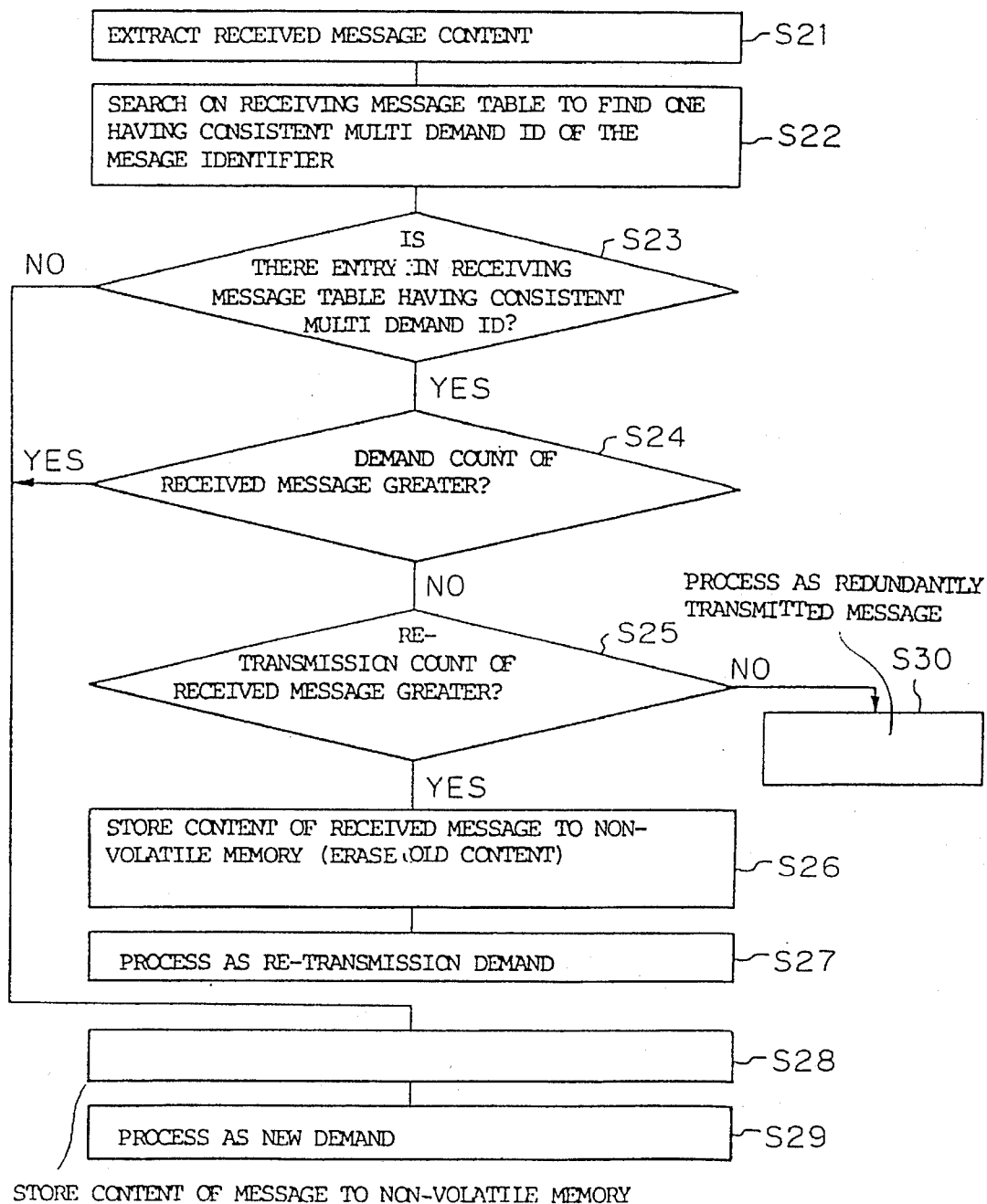
FIG. 24 is a flowchart showing a message receiving process at a receiving side server in the third aspect.

FIG. 23 is a flowchart of the message transmitting process to be executed by the transmitter side server in the third aspect. FIG. 22 shows a flowchart of a re-transmission process when the transmitter side server is re-started. FIG. 24 shows a flowchart showing a message receiving process executed by the receiver side server.

In FIG. 23, when a message transmission demand is generated at the GS space 101 of the transmitter side current system, the message communication path is obtained for preparation of the message transmission demand. Namely, the multi-demand ID, which is not currently used, for example MSG ID1, is obtained (step S1). Then, the demand counter of the MSG ID1 is incremented by "1" (step S2). Also, the re-transmission counter value of the MGS ID1 is set to "0" (step S3). With respect to the MSG ID thus generated, the content of the message ID is stored in the transmitting message table 101-5 together with the content of the message. Also the content of the message ID and the content of message are also stored in the non-volatile memory, which is not shown (corresponding to the non-volatile memory of FIG. 19). The non-volatile memory is accessible even by the GS space of the stand-by system (step S4). Then, a request is made to the supervisor 104 with the content of the message together with the corresponding message identifier MSG ID1 for a message transmission. Then, a response message is received (step S5). When the response message represents receipt of the transmitted message, namely, when each item of the message and the message identifier are stored in the MSD ID and the message content storing area in the receiving message table 201-5 of the GS space 201. If the process is not interrupted by the receiver side GS (step S6), then an opening or release of the message communication path is performed (step S8). If however, the process is interrupted, then the re-transmission count of the message identifier is incremented by "1" (step S7). The opening of the communication path is then performed (step S8).

In FIG. 22, when the transmitter side current GS is down for some reason, the transmitter side stand-by GS is started so that the GS space 102 of the transmitter side stand-by system takes over the process of the GS space 101 of the transmitter side current system, to re-transmit the message. Namely, in the GS space 102 of the transmitter side stand-by system, the content of the message communication stored in the non-volatile memory, for example, the message identifier and content of message associated with the message identifier MSG ID1 in the case that the re-retransmission process is performed for the message identifier MSG ID1, is read out from the above-mentioned non-volatile memory, and stored in the transmission message table of the GS space 102 of the transmitter side stand-by system (step S11). Thereafter, the re-transmission counter value of the message identifier is incremented by "1" (step S12), the MSG ID1 on the transmission message table is replaced with the new message identifier and the new message identifier is stored in the non-volatile memory (step S4). Then, as in FIG. 23, a message transmission is requested to the supervisor 104 by adding the new message identifier MSG ID1 to the corresponding message content. The response message thereto is received by the GS of the stand-by system (step S5). Since the subsequent process is identical to that of FIG. 23, the discussion is neglected.

Since the message identifier and the content of message to be transmitted immediately before the transmitter side current system goes down are maintained in the non-volatile memory, even when the GS space 101 of the transmitter side current system becomes impossible to use, the GS space 102 of the transmitter side stand-by system, which is initiated in place, can restore the state immediately before the transmitter side current system goes down.

On the other hand, upon re-transmission of the message, since the state immediately before the occurrence of the transmitter side current system can be restored, re-transmission can be easily performed based thereon.

In FIG. 24, the content of the message and the message identifier thereof transmitted from the GS of the transmitter side current system or the stand-by system, are received by the GS space 201 of the receiver side current system or the GS space 202 of the receiver side stand-by system in case the GS of the receiver side current system is down. The GS space 201 of the receiver side current system stores the content of the message and the message identifier thereof in the receiving message table 201-5.

Once the storing in the receiving message table 201-5 is successfully completed, the GS of the receiver side current system requests transmission of the receiving message for notifying reception to the supervisor 50. On the other hand, when the receiver side current system is down and cannot receive the message transmitted from the GS of the transmitter side, the supervisor 104 transmits a response notifying this fact to the GS of the transmitter side current system,. Then the receiver side stand-by system is initiated. Thereafter through the process set forth above, the re-transmitted transmitting message is stored in the receiving message table in the GS space 202 of the receiver side stand-by system. Then, the GS of the receiver side stand-by system requests the supervisor 50 to transmit the response message notifying reception.

Under such conditions, namely, the message is received by the GS of the receiver side, discussion will be provided for the example in which the message is received by the current system. The content of the receiving message received by the receiver side current system is extracted (step S21). Then, judgement of same or different is done the message identifier 300 given for the received message and shown in FIG. 20. A search is performed against the receiving message table 201-5 for finding the message identifier having the same multi demand ID 300-1 (step S22). Then entry consistent with the multi demand ID exists in the receiving message table 200-5 (step S23), for example when the MSG ID1 is consistent with the multi demand ID, and subsequently, comparison for the demand counter 300-2 of the message identifier 300 MSG ID1 (step S24) is performed. If the demand counter of the received message is not greater, comparison for the re-transmission counter 300-3 of the message identifier with the counter value of the re-transmission counter of the MSG ID1 is made (step S25). When the re-transmission counter of the received message is greater, the content of the received message, namely, the content of the message and the message identifier are written in the area for MSG ID1 of the receiver side non-volatile memory, which is not shown. Accordingly, the preceding memory content is erased (step S26). At the same time, the GS of the receiver side current system updates the content of the receiving message of the area for MSG ID1 in the receiving message table 201-5. Namely, the process is performed regarding the message transmitted in response to a demand for re-transmission due to occurrence of system down of the GS at the transmitter side or the GS at the receiver side (in case GS is current system) (step S27).

When the re-transmission counter of the received message is not greater than the re-transmission counter of MSG ID1 at step S25, as set out with respect to the re-transmission counter of the message identifier 300, according to the rule for performing re-transmission with incrementing "1" at every occasion, the process performed regarding the received message is the redundant transmission of the already received message (step S30).

On the other hand, when the demand counter of the received message is greater than the demand counter of MSG ID1 at step S24, as discussed with respect to the demand counter in the message identifier 300, according to the rule for adding "1" when a new demand is processed after completion of one demand, the content of the message, namely the content of message and the message identifier, is stored in the not shown non-volatile memory regarding the received new message (step S28). At the same time, the GS of the receiver side current system updates the content of the receiving message on the receiving message table 201-5 and perform a process as the new demand (step S29).

Similarly, when the multi demand ID of the received message is not entered in the receiving message table 201-5 at step S23, the content of the message and the message identifiers are written in the area for new MSG ID1 of the not shown non-volatile memory of the receiver side regarding a completely new message.

In the above, discussion has been made for FIG. 24 with respect to the case that the receiver side is the current system GS. However, even when the current system GS is down and thus the stand-by system GS is started, the GS of the stand-by system, once started, can perform the process for re-establishment of the receiving message table in the GS of the stand-by system at that time in the aid of the receiver side non-volatile memory, which is not shown. Therefore, the process similar to that discussed with respect to the GS of the current system can be performed.

As set forth above, according to the third aspect of the invention, even when the GS at the receiver side is down, reference can be made to the old message identifier stored in the non-volatile memory to generate a new message identifier corresponding to the transmission format. Then, the message identifier is transmitted together with the content of the message. Furthermore, since the architecture is taken to perform a comparison of the new message identifier and the stored old message identifier at the GS of the receiver side, the message can be recognized as the re-transmitted message at the GS of the receiver side. Therefore, prevention of loss of the message and detection of the retention transmission can be achieved. Accordingly, system down can be successfully avoided.

The present invention is effective for the approach to fault toleration in the distributed processing system established by coupling nodes with the network, and particularly effective against failure due to failure in the software.

We claim:

1. A message communication processing system implemented by a computer network including first, second, and third interconnected computers, said message communication processing system comprising:

client process means for issuing a message including a demand and implemented by the first computer of the computer network;

processing server means for processing the message and implemented by the second computer of the computer network; and processing server means for processing the message implemented by the second computer of the computer network; and reception server means for controlling communication between said client process means and said processing server means and implemented by the second computer of the computer network or by the third computer of the computer network, said reception server means including demand discrimination means for distinguishing between a first demand used only for referencing and not updating one of a medium and a state of a source, and a second demand used for referencing and updating a process associated with a change of the state of the source, wherein said processing server means comprises:

discrimination stage means for determining whether the processing of the message transmitted from the client process means has already been completed;

demand processing stage means for performing a demand process for the message received from the client process means when said discrimination stage means determines that the processing of the message transmitted from the client processing means is not completed;

writing stage means for writing the results of the demand process performed in said demand processing stage to a non-volatile memory; and issuing stage means for issuing a first notice that the message processing has already been completed as determined by said discrimination stage means and a second notice that the demand process performed by the demand processing stage means is normally completed when said discrimination stage means determines that the processing is not completed, said client process means determines that the message communication is normal when a re-transmission process for the message is performed and said first notice that the process has already been performed is issued.

2. A message communication processing system including a stand-by system, said message communication processing system being in a distributed processing system implemented by a computer network including first, second, and third interconnected computers, said message communication processing system comprising:

client process means for issuing a message including a demand and implemented by the first computer of the computer network;

processing server means for processing the message and implemented by the second computer of the computer network; and reception server means for controlling communication between said client process means and said processing server means and implemented by the second computer of the computer network or by the third computer of the computer network, said reception server means including demand discrimination means for distinguishing between a first demand used only for referencing and not updating one of a medium and a state of a source, and a second demand used for referencing and updating a process associated with a change of the state of the source, wherein said reception server means identifies said processing server means which becomes a service provider for a service demand, and demands provision of the service demand from the processing server means, said reception server means adds an identifier and a reception re-transmission count to the message issued from the client process means forming a process message to be transmitted to the processing server means, and said processing server means stores the identifier and first and second re-transmission counts as change over information used for a stand-by system, said processing server means performing a comparison between said first and second re-transmission counts and said reception re-transmission count to determine whether said message is a re-transmitted message or a redundantly transmitted message.

3. A message communication processing system as set forth in claim 2, wherein the comparison is performed in such a manner that, when said reception re-transmission count is greater than the first re-transmission count, said processing server means determines that the message is the re-transmitted message, when said reception re-transmission count is smaller than said first re-transmission count, said processing server means determines that the message is the redundantly transmitted message, and when said reception re-transmission count and said first re-transmission count are equal, a further comparison is performed between the reception re-transmission count added to said message by said reception server means and the second re-transmission count, and when said reception re-transmission count is greater than the second re-transmission count said processing server means determines that the message is the re-transmitted message, and when said reception re-transmission count is smaller than or equal to said second re-transmission count, said processing server means determines that the message is the redundantly transmitted message.

4. A message communication processing system as set forth in claim 2, wherein the message communication processing system includes the stand-by system, a current system, and a non-volatile memory for storing the message and the identifier as a stored message and a stored message identifier and connected to and in common with said current system and said stand-by system, wherein each of the current system and the stand-by system include current and stand-by identifier discrimination stages, each for discriminating whether the stored identifier is identical to a new identifier included in a new message, and wherein said identifier comprises a multi demand identifier, a demand counter and a re-transmission counter, said multi demand identifier and the identifier used for determining new transmissions and re-transmissions, are added to the message when the message is transmitted.

5. A recovery system in a distributed processing system implemented by a computer network including connected computers, transmitting a first message issued by a client process after a software problem has been experienced, said recovery system comprising:

process server means, implemented by a first one of the computers of the network, for receiving and processing a second message and determining whether the second message is one of a new, redundant and re-transmitted message using a message identifier and first and second re-transmission counts included in the second message; and reception server means, implemented by a first one of the computers of the network or by a second computer of the network, for identifying said process server means for processing the message and receiving the first message from the client process and inserting in the first message the message identifier, and the first and second re-transmission counts forming the second message, and for identifying said process server means and transmitting the second message to the said process server means identified without maintaining storage of the first and second messages.

6. A recovery system as set forth in claim 5, wherein the second message includes a process content, and said process server means includes a non-volatile memory, and wherein the process content of the second message is only stored in said non-volatile memory.

7. A recovery system in a distributed processing system including current and stand-by global service systems, comprising:

a message controller connected between said current and stand-by global service systems and transmitting messages including a message identifier between said current and stand-by global service systems; and a non-volatile memory, connected to each of said current and stand-by global service systems, and commonly storing the messages accessible to each of said current and stand-by global service systems and used by said stand-by system when said current system experiences a software failure, said stand-by global service system adding an identifier indicative of a retransmission of said messages when said current global service system experiences a software failure.

8. A recovery method in a distributed processing system implemented by a computer network, transmitting a first message issued by a client process after a software problem has been experienced, said recovery method comprising the steps of:

(a) receiving the first message from the client process and inserting in the first message a message identifier, and first and second re-transmission counts forming a second message using a reception server;

(b) identifying a process server using the reception server;

(c) transmitting the second message to the process server without maintaining storage of the first and second messages in the reception server; and (d) processing the second message and determining whether the second message is one of a new, redundant and retransmitted message using the message identifier and the first and second re-transmission counts using the process server.

9. A recovery system as set forth in claim 8, wherein the second message includes a process content, and the process server includes a non-volatile memory, and wherein said processing step (d) further comprises the step of storing the process content of the second message only in the non-volatile memory.

10. A message communication processing system in a distributed processing system implemented by a computer network including first, second, and third interconnected computers, said message communication processing system comprising:

client process means for issuing a message including one of a first type demand and a second type demand, and implemented by the first computer of the computer network;

processing server means for processing the message and implemented by the second computer of the computer network; and reception server means for controlling communication between said client process means and said processing server means and implemented by the second computer of the computer network or by the third computer of the computer network, said reception server means including demand discrimination means for distinguishing between said first type demand and said second type demand, wherein said processing server means comprises:
  discrimination stage means for determining whether the processing of the message transmitted from the client process means has already been completed,
  demand processing stage means for performing a demand process for the message received from the client process means when said discrimination stage means determines that the processing of the message transmitted from the client processing means is not completed,
  writing stage means for writing the results of the demand process performed in said demand processing stage to a non-volatile memory, and
  issuing stage means for issuing a first notice that the message processing has already been completed as determined by said discrimination stage means and a second notice that the demand process performed by the demand processing stage means is normally completed when said discrimination stage means determines that the processing is not completed, and said client process means determines that the message communication is normal when a re-transmission process for the message is performed and said first notice that the process has already been performed is issued.

11. A message communication processing system, including a stand-by system, in a distributed processing system implemented by a computer network including first, second, and third interconnected computers, said message communication processing system comprising:

client process means for issuing a message including one of a first type demand and a second type demand, and implemented by the first computer of the computer network;

processing server means for processing the message and implemented by the second computer of the computer network; and reception server means for controlling communication between said client process means and said processing server means and implemented by the second computer of the computer network or by the third computer of the computer network, said reception server means including demand discrimination means for distinguishing between said first type demand and said second type demand, wherein said reception server means identifies said processing server means which becomes a service provider for a service demand, and demands provision of the service demand from the processing server means, said reception server means adds an identifier and a reception re-transmission count to the message issued from the client process means forming a process message to be transmitted to the processing server means, and said processing server means stores the identifier and first and second re-transmission counts as change over information used for the stand-by system, said processing server means performing a comparison between said first and second re-transmission counts and said reception re-transmission count to determine whether said message is a re-transmitted message or a redundantly transmitted message.

12. A message communication processing system as claimed in claim 11, wherein the comparison is performed in such a manner that, if said reception re-transmission count is greater than the first re-transmission count, said processing server means determines that the message is the re-transmitted message, if said reception re-transmission count is smaller than said first re-transmission count, said processing server means determines that the message is the redundantly transmitted message, and if said reception re-transmission count and said first re-transmission count are equal, a further comparison is performed between the reception re-transmission count added to said message by said reception server means and the second re-transmission count, and if said reception re-transmission count is greater than the second re-transmission count said processing server means determines that the message is the re-transmitted message, and if said reception re-transmission count is smaller than or equal to said second re-transmission count, said processing server means determines that the message is the redundantly transmitted message.

13. A message communication processing system as claimed in claim 22, wherein the message communication processing system includes the stand-by system, a current system, and a non-volatile memory for storing the message and the identifier as a stored message and a stored message identifier and connected to and in common with said current system and said stand-by system, each of the current system and the stand-by system include current and stand-by identifier discrimination stages, each for discriminating whether the stored identifier is identical to a new identifier included in a new message, and said identifier comprises a multi demand identifier, a demand counter and a re-transmission counter, said multi demand identifier and the identifier used for determining new transmissions and re-transmissions, are added to the message when the message is transmitted.

\* \* \* \* \*

UNITED STATES PATENT AND TRADEMARK OFFICE
CERTIFICATE OF CORRECTION

PATENT NO. : 5,596,720
DATED : Jan. 21, 1997
INVENTOR(S) : HAMADA et al.

It is certified that error appears in the above-indentified patent and that said Letters Patent is hereby corrected as shown below:

Col. 1, line 54, change "Of" to --of--.

Col. 3, line 10, change "contend" to --content--.

Col. 4, line 51, after "of" delete ",".

Col. 6, line 18, after "guarantee" insert --the--;
line 51, change "failure the server" to --the server failure--.

Col. 7, line 65, change "proceesd" to --proceeds--.

Col. 8, line 12, change "show" to --shown--.

Col. 9, line 58, after "for the" insert --process--.

Col. 11, line 47, after "therein" insert --,--.

Col. 15, line 58, change "10 100" to --100--.

Col. 20, lines 23-25 (Claim 1, lines 11-13), delete in their entirety.

Signed and Sealed this

Eighth Day of July, 1997

Attest:

BRUCE LEHMAN

*Attesting Officer*    *Commissioner of Patents and Trademarks*